(12) United States Patent
Jähn et al.

(10) Patent No.: US 7,074,364 B2
(45) Date of Patent: Jul. 11, 2006

(54) DEVICE AND METHOD FOR CARRYING OUT EXPERIMENTS IN PARALLEL

(75) Inventors: Peter Jähn, Leverkusen (DE); Georg Wiessmeier, Bergisch Gladbach (DE); Bernhard Krumbach, Leverkusen (DE); Reinhold Rose, Leverkusen (DE); Thomas Siebert, Leverkusen (DE); Rainer Krautkrämer, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 675 days.

(21) Appl. No.: 10/135,500

(22) Filed: Apr. 30, 2002

(65) Prior Publication Data

US 2002/0172629 A1 Nov. 21, 2002

(30) Foreign Application Priority Data

May 10, 2001 (DE) .................................. 101 22 491

(51) Int. Cl.
*G01N 21/00* (2006.01)
(52) U.S. Cl. .................... 422/62; 422/104; 422/196; 422/197; 422/102; 436/34; 436/37; 436/43; 436/85
(58) Field of Classification Search ................ 436/34, 436/37, 43, 85; 422/62, 104, 196, 197, 102
See application file for complete search history.

(56) References Cited

U.S. PATENT DOCUMENTS

| 5,395,594 | A | * | 3/1995 | Nokihara et al. | ........... 422/135 |
| 5,762,881 | A | | 6/1998 | Harness et al. | ............. 422/132 |
| 6,132,686 | A | | 10/2000 | Gallup et al. | ............... 422/130 |
| 6,455,316 | B1 | * | 9/2002 | Turner et al. | ................. 436/37 |
| 6,558,632 | B1 | | 5/2003 | Güller et al. | ............... 422/104 |

FOREIGN PATENT DOCUMENTS

| DE | 297 19 919 | 5/1999 |
| EP | 0 916 397 | 5/1999 |
| WO | WO 96/11878 | 4/1996 |
| WO | WO 98/39099 | 9/1998 |
| WO | WO 98/57739 | 12/1998 |
| WO | WO 00/09255 | 2/2000 |
| WO | WO 01/93998 | 12/2001 |

* cited by examiner

*Primary Examiner*—Glenn Caldarola
*Assistant Examiner*—Alexis Wachtel
(74) *Attorney, Agent, or Firm*—Norris McLaughlin & Marcus PA

(57) ABSTRACT

Modular device and method for carrying out experiments in parallel on process substances to develop technical methods, comprising at least a multiplicity of individual reactors which are controllable independently of one another said reactors being comprised of pressure-tight chambers having separable sample vessels, and optionally, stirring devices, heating instruments, cooling instruments, or both, a monitoring unit for monitoring or controlling at least the pressure and the temperature in the individual reactors, pressure-tight lids having independent feed lines and optionally independent discharge lines for individual process substances; a plurality of the lids being simultaneously sealable upon the rectors by a common sealing means (11).

28 Claims, 16 Drawing Sheets

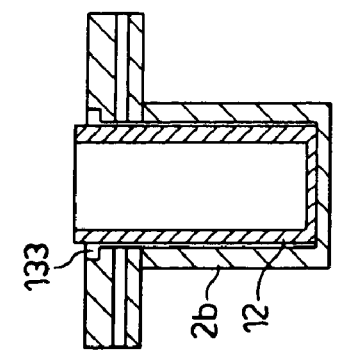
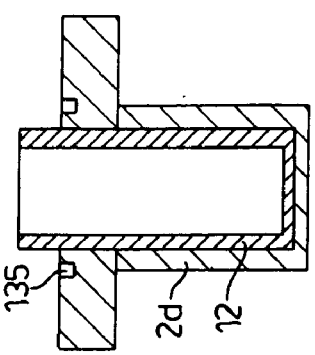
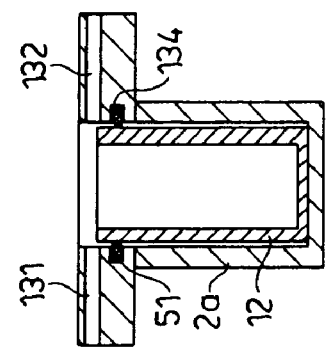
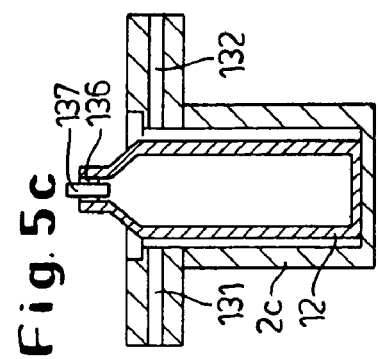
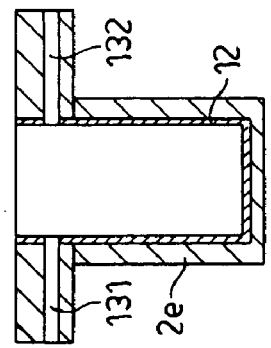

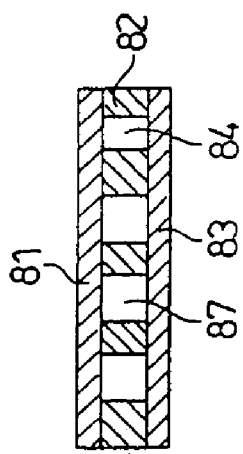
Fig. 8  Section A-A
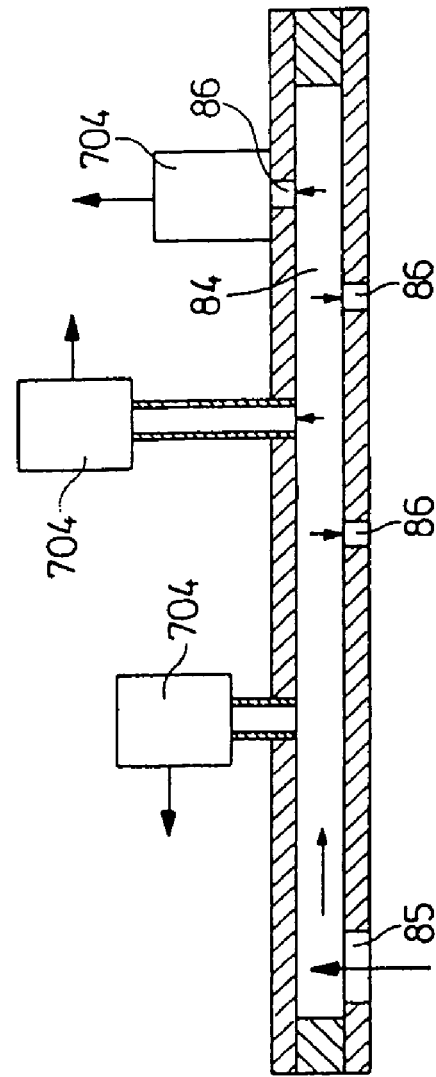
Fig. 8a  Section B-B

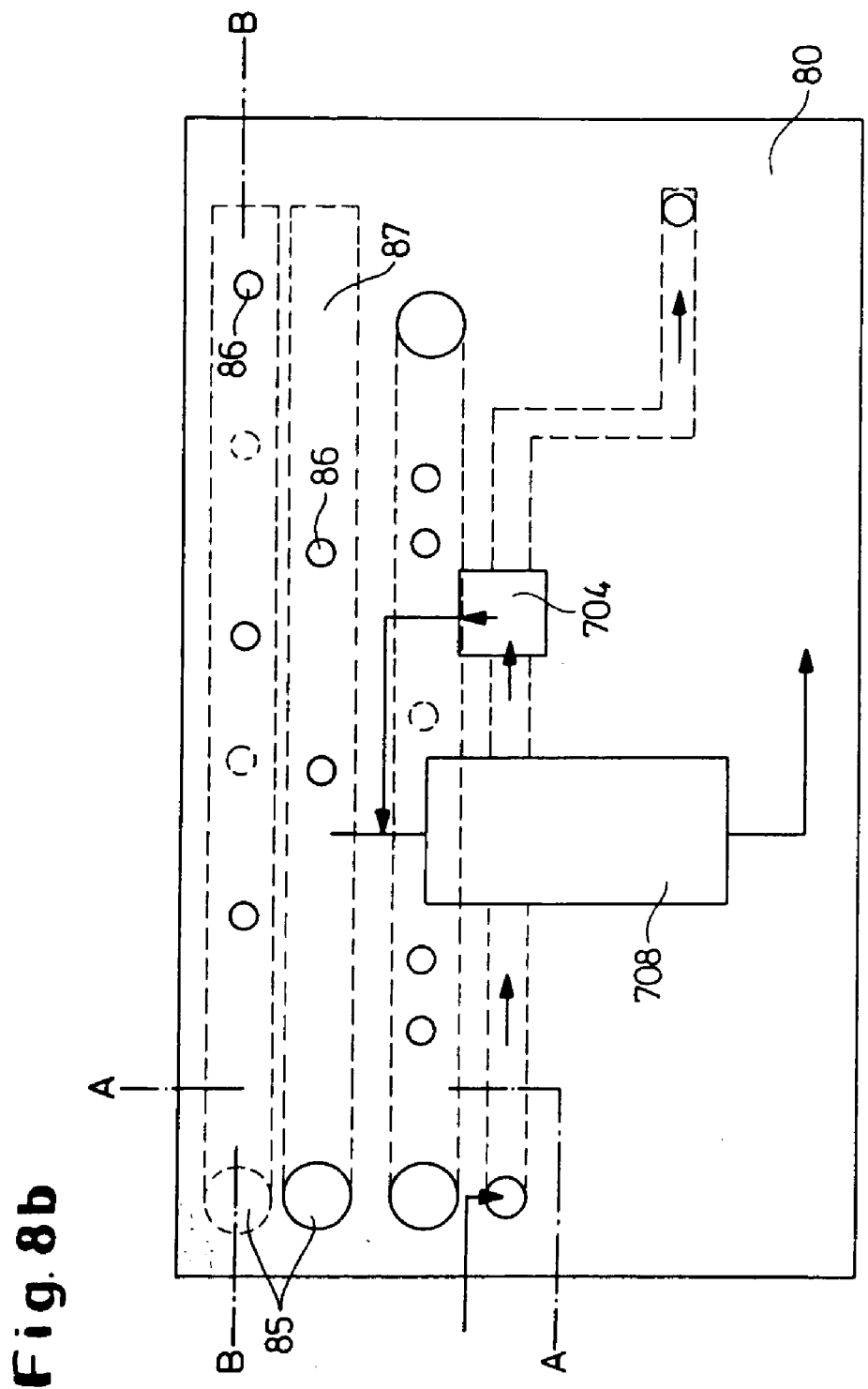

DEVICE AND METHOD FOR CARRYING OUT EXPERIMENTS IN PARALLEL

The present invention relates to a method and to a device for efficiently carrying out experiments under realistic conditions to develop methods, in particular chemical and physical methods. The device for carrying out the experiments, which are miniaturized and organized in parallel for this purpose, comprises individual containers in which experiments are carried out, as well as apparatus for the distribution and feed of the required substances into the individual containers; sensors, actuators, and apparatus for process control and analysis. The method comprises reliable, automatic conduct of the experiments, including initialization, setting all the reaction parameters, dosing the substances, taking samples and reproducing the initial state, as well as transfer of the data recorded during the experiments to a database.

BACKGROUND OF THE INVENTION

The efficiency of many experimentally based developments can be increased by miniaturization, automation and parallel operation. Especially in active-agent research for medicines and plant protection products, this procedure has already become widely used: so-called high throughput screening (HTS) with up to 100,000 experiments per day is the established state of the art in this context. The development of parallel screening methods has also gained acceptance in other fields, such as catalyst, material and process development. In this case, catalysts, formulations or reaction parameters are varied. The experiments can be planned according to rational, statistical, combinatorial or evolutionary approaches. For the latter applications, the technical requirements when carrying out experiments can be substantially more complex than in the case of HTS for active-agent research (e.g. owing to fluctuating process parameters: temperature, pressure, stirring etc.). For this reason, various parallel systems have to date been described in the literature and introduced to the market.

The most common and simplest systems for carrying out non-pressurized parallel reactions involve reaction blocks, in which solid blocks are drilled with holes to hold a wide variety of sizes of test tubes. The temperature of the test tubes is adjusted via the surrounding block material, either electronically or through the use of a heat exchange fluid. Individual recording of the temperatures in the test tubes is not provided for in the majority of cases, however. The substances contained in the test tubes may be mixed by stirring with an individually adjustable or globally constant stirrer speed. The substances may be added batch-wise via septa. In the majority of cases, it is possible to pass an inert gas over the test tube contents by using a central gas distributor. The blocks are constructed in such a way that it is possible to produce widely differing temperature zones in them at different levels in the form of thick plates (e.g. for reactions under reflux). Such systems are available, for example, from the company H&P, Oberschleißheim/De under the product name Variomag®. In other known devices for parallel synthesis, the blending in each test tube is carried out using axially guided magnets. The amplitude and frequency of the temperature excursions can be specified. The temperature is adjusted using a hotplate or by immersing the entire reactor block in a cooling mixture. The described reactor blocks can be operated under standard pressure at temperatures between about −80 and about 300° C. The degree of parallel operation, i.e. the number of experiment vessels present in a device, is generally between 10 and 50. The reaction blocks are usually designed in such a way that they can be filled by using an automated pipette (referred to as a liquid handler).

The fact that only a few of the working steps of a synthesis can be carried out with the above-described reaction blocks has resulted in the development of a further generation of reaction blocks. With this new generation, the conditions for the individual test tubes—or, more generally, also referred to as inliners—can be specified and monitored more or less individually and automatically. The dosing of gases and liquids and the isolation and withdrawal of samples are also possible with these reaction blocks. Some of the synthesis parameters can be specified via programmable controllers. Examples of this development are the device known from WO 98/39099 or the reaction block described in U.S. Pat. No. 5,762,881. These systems have been automated in a further step and combined with a liquid dispensing system (liquid handler), so that the method steps from addition of the substances up until injection into an analyzer take place in an automated fashion. The pressure and temperature ranges that can be achieved, however, correspond to those of the simple known reaction blocks described above.

The systems described so far are essentially used for parallel synthesis of organic, chemical substances or synthesis optimization. There has recently been greater interest in equipment which can be used to test material properties even under extreme conditions with parallel methods. Examples of this include superconductors, materials with luminescent properties or catalysts (cf. e.g. WO 96/11878). The specification WO 00/09255 describes a parallel reactor and its use for the production, testing and characterization of materials. The conditions of the process are recorded and monitored. This document describes various options for a parallel reactor: temperature control and monitoring for use in calorimetry, stirring systems for use in viscosity tracking, mechanical oscillators for use in viscosity measurement, pressure sensors for use in determining gas consumption, automated pressure dosing systems, and analysis of experimental data. The commercially available, individually stirrable and globally temperature-adjusted 10 ml individual reactors can be operated at pressures up to about 100 bar. The gas can be supplied with pressure monitoring for each individual reactor.

The respective field of use of the parallel reactor systems referred to in the above-described prior art is restricted in terms of experimental conditions. The absolute upper pressure limit is about 200 bar. Temperatures above 350° C. cannot yet be achieved for individual vessels operated in parallel. Neither is it known whether continuous dosing of gases and/or liquids under these extreme conditions is possible.

It is therefore an object of the present invention to produce an automated parallel reaction system in miniaturized form, which is suitable for even extreme experimental conditions, which is also very easy to adapt to very widespread experimental conditions and, at the same time, can be operated reliably. The term "reactor system" is to be understood below as being a device that consists of a plurality of individual reactors, in which generally chemical or physical methods can be carried out.

The intention with this reactor system is to find test conditions or compositions which can be reproduced optimally under technically realistic operating conditions, by varying the quantity and ratio of the relevant substances and process parameters. The process optimization requires, for example, with already optimized constant reaction partners, that the reaction rate be optimized by further variation of temperature and/or pressure and/or stirring energy. This demands a high level of control and regulation from the technique, since each individual reactor must be controllable and operable separately.

Both points are of high economic importance, so that laboratory discoveries can be implemented more directly into working practice.

Compared with the known reactor blocks, the device is intended to be adaptable in a straightforward way and rapidly to new test conditions. This involves both fast accessibility of the reaction chambers after the end of the test and fast, in particular pressure-tight, resealing of the chambers.

The intention with this device is also for the equipment facilities of a physics/chemistry laboratory to be improved substantially, for example so that varying tasks can be carried out easily with high accuracy and reproducibility in terms of pressure, temperature, stirring rate and test strategy. "Varying tasks" means that temperatures from −80° C. to 400° C. can be set, with an absolute pressure of up to 400 bar. These temperature and pressure ranges place great demands on the technique of the overall system, so that known reactor systems and system components, such as manual valves, controllable fitments, pipeline screw connections, reactors and temperature adjustment systems cannot generally be used.

The extended task comprises carrying out a complete experiment, i.e. the parallel reactor system is to be loaded manually or automatically with the starting components of a test in the required quantity, so that all the subsequent steps of a test can then be carried out automatically under defined conditions. The individual procedures of a test consist in the parallel or sequential combination and/or dosing of one or more liquids and/or gases and/or solids under monitored and defined test conditions. This also involves e.g. being able to carry out a reaction with a short time profile at elevated temperature, while avoiding the long heating time inherent in the design of known reactor systems.

Furthermore, experimental procedures often need to be pressure-controlled and pressure-monitored, e.g. so that a reaction procedure can be controlled and detected from processing standpoints. A further automated facility for controlling an experiment is to be provided by a sampling system in conjunction with suitable analyzers. The discharge and/or controlled extraction of e.g. gaseous minor reaction constituents from the reaction space of individual containers, while retaining the starting components that are used, e.g. by condensation, should in principle be possible.

In the case of carrying out a chemical reaction, the device should be compatible with setting both a reaction condition and a reaction procedure which correspond to those of the technical process. In this context, "experiment" means not just chemical reactions, but also physical state changes of substances being studied: e.g. crystallization, solubility tests, stability tests etc. The device should, in particular, also provide the opportunity to perform multistage chemical synthesis in an automated and continuous way, so that a high rationalization effect can be achieved for laboratories.

Many chemical reactions release large amounts of reaction heat, so that carrying out a test reproducibly with constant parameters requires a powerful, fast-reacting temperature adjustment system. If the reaction scheme is exothermic, then different amounts of reaction heat will be released depending on the test procedure and the test time. The reaction heat released at the start of a reaction is often very high, so that the exothermicity decreases as the test time increases. This fact results in the special requirement for a fast-reacting and powerful, controllable temperature adjustment system. Many reactions take place very rapidly. In this case, it is particularly important for the equipment component masses to be temperature-adjusted, which act as energy stores, to be configured in such a way that a temperature adjustment system reacts quickly, i.e. in the range of only a few seconds, so that the temperature of the reaction in the reaction equipment is kept constant. For this special task, it is often necessary to use different heat exchange media, so that the internal temperature of the reactor can be controlled and kept constant. Air, cooling water or cooled sols may be used as heat exchange media. These coolants act with different intensities owing to their specific heat capacities, so that different quantities of reaction heat may be dissipated by the specific coolant depending on the progress of the reaction. This fast-reacting temperature control of the reaction space also requires additionally controllable valves with particularly short switching times.

When carrying out parallel high-pressure tests (pressure up to 400 bar at temperatures up to 300° C.) on a miniaturized scale (<10 ml working volume), great importance is attached to the sealing of the overall equipment. Even very minor leaks in the overall equipment, e.g. in valves or commercially available cutting-ring or clamping-ring screw connections, render all the results unusable. Consideration of a technical reactor system, with which an integrated test run is to be carried out in parallel from chemical and process standpoints, often shows more than 30 connection points per individual reactor system in the technical layout, at which leaks may occur. If these connection points are multiplied by the degree of parallel operation, there are easily several hundred potential leak points in a very small space, which need to be checked for leaks and make it impossible for the operator to work efficiently with the miniaturized parallel reactor system. For this reason, it is necessary to seek alternatives to the known connection systems, which exhibit a better sealing behavior or avoid such releasable connection points.

SUMMARY OF THE INVENTION

The subject matter of the invention, by which the above object is achieved, is a device for carrying out experiments in parallel on process substances to develop technical methods, in particular chemical and physical methods, comprising at least a multiplicity of, in particular at least 6, preferably at least 12, particularly preferably at least 24, individual reactors, the individual reactors being controllable or regulatable independently of one another at least with respect to their internal pressures and their temperatures, wherein the individual reactors are constructed at least from: for each of them, a pressure-tight chamber having a separable sample vessel, and optionally a stirring device for each of them, a heating instrument and/or a cooling instrument for each of them for individual temperature adjustment of the sample vessel, a monitoring unit for monitoring or regulating at least the pressure and the temperature in the individual reactors, a pressure-tight lid for each of them, the individual lids and/or the chambers having, independently of one another, feed lines and optionally discharge lines for individual process substances, and a plurality of lids of the chambers being simultaneously sealable by using a common sealing means, preferably a sealing latch.

DETAILED DESCRIPTION

The sealing latch can be locked e.g. manually or, preferably, pneumatically, hydraulically or by using an electrical drive. Depending on the arrangement of the individual reactors, the locking may be carried out by horizontal displacement of the sealing means, or by a rotational movement of the sealing latch if the reactors are arranged with a circular shape. The sealing latch can, in particular, be moved in two axial directions. The sealing vertical movement of the latch is used to deform the seal between the lid and the pressure-tight chamber, and is generally a multiplicative factor smaller than the horizontal movement.

The ratio of the horizontal movement to the vertical movement is preferably more than 100. By the closing horizontal movement of the latch, which typically corresponds to half the axial reactor spacing, the lid and the chamber are vertically fixed tightly into a sealing position and are arrested or, after the end of the test, they are released again so that the lid can be separated from the chamber. The vertical movement of the latch, which takes place after the horizontal movement, applies a desired deformation force to the seal positioned between the lid and the chamber. Depending on the level of automation of the device, the sealing force to be applied vertically may additionally be generated electrically, pneumatically or hydraulically. Depending on the test conditions, a preferred embodiment may be selected in which the reaction system is tightly sealed simultaneously with the horizontal movement of the latch. In this case, there is a wedge-shaped surface on the lower latch arm or on the upper edge of the pressure-tight lid flange, the closing fastened state of the latch generates a vertically acting force on the inserted soft seal and compresses it, so that all the individual reactors of the reaction system are tightly closed.

The closure technique according to the invention avoids the error-prone manual closure of pressure-tight individual containers arranged in parallel, so that no time delay is encountered during automated operation. For carrying out tests under a particularly high pressure, the automated vertical closing movement should preferably be carried out with a plurality of separate hydraulic cylinders, so that the spatial dimensions of the horizontal drive remain compact.

A plurality of individual reactors are preferably combined as blocks in a holding unit.

The arrangement of the multiplicity of individual reactors with respect to one another may be carried out in parallel, in series, or concentrically.

The heating or cooling instruments and/or the feed lines and discharge lines for process substances are preferably connected to at least one supply unit.

A particularly preferred embodiment of the device is characterized in that the cooling instrument can be operated with alternating heat exchange media and/or simultaneously with different heat exchange media, in particular with air, oil and water, the intake of which can be controlled or regulated by the monitoring unit.

The individual reactors are especially preferably designed so that they can be controlled independently of one another throughout a pressure range from about 1 bar to 400 bar and a temperature range of from about −80° C. to +400° C. and/or optionally up to a stirrer speed of about 2000 rpm.

A plurality of individual reactors are particularly preferably connected via lines in the lid and/or the pressure-tight chamber to an associated supply unit and/or a substance distribution unit. Furthermore, a temperature adjustment unit, comprising a heating instrument and/or a cooling instrument, may likewise be connected to a substance distributor unit. The substance distributor unit preferably comprises actuators, and the supply unit comprises, for example, the required sensors, and they simultaneously form the intermediary for connection to an interface unit, e.g. in the form of electrical circuit boards, to which the process control system or the monitoring unit is coupled. The substance distributor unit is preferably a miniaturized distribution module having low-level sealing features in a particularly compact embodiment, which is stable with respect to the high pressure and temperature requirements of the individual reactors. Substance distributor units, with the actuators fitted, can be positioned in immediate proximity to the individual reactors and form, with the feed and discharge lines which have a low susceptibility to clogging, the closure of the pressure spaces of individual reactors. The volume of the individual reactors is in this case increased only insubstantially. The substance distributor unit may also be used for separate temperature adjustment and/or cooling of the individual reactors. Owing to the particularly compact construction, at least one substance distributor with associated actuators can be mounted in the holding unit.

Conventional roll-necked test tubes, for example, may be used as the sample vessels. If the chambers and the sample vessel are especially designed in one piece, then it is expedient to line the walls of the chambers with an inert, corrosion-resistant coating.

The lids of individual reactors preferably have additional pressure reducing lines in order to set a reduced pressure in the reaction chambers.

For various tasks to be dealt with, and the concomitant equipment variation of the individual reactors, adaptation or modification to the respective tasks by changing various embodiments of the lid offers particular advantages, since only one component needs to be altered or varied. The reactor lids which can be used in various modules satisfy different operation-related process requirements in terms of the reactions to be carried out, so that the reactor lid may be regarded as a process- or reaction-dependent replacement module. Therefore, a multiplicity of differently configured lids is desirable for economic operation of a parallel reactor system. Various lid configurations for specific tasks will be listed below, the described features of the individual lid embodiment also being implementable together and in combination on a single lid. The purpose of the lid is to delimit and close the test space. The test space is a cavity formed by the cavity of the pressure-tight chamber and the cavity of the lid. The test space can be made larger or smaller by appropriate lid design. The enlargement of the product-contact test space of the individual reactor depends on the optimum substance quantity, formed by all the components involved in a test formulation and an additional volume to reliably prevent hydraulic filling of the test space. For this reason, it is possible by adding an incorporated cavity in the lid to increase the test space of the pressure-tight chamber by up to 50% or more in a straightforward way, especially if the substances are contained in a sample vessel that can be fitted into the individual reactor (2-piece embodiment). All the lids preferably have a concentric offset outer region, on which the sealing latch rests in the closed state and optionally applies the required sealing force when the chamber has an elevated internal pressure. In the simplest embodiment, the lid does not have any openings for the substance feed or discharge. These are then arranged on the chamber. This simple lid can, however, be fitted with a thermometer protection tube, in order to record and control the process via the internal temperature. The simple lid has advantages for synthesis in which gaseous reaction components are taken up rapidly over the liquid surface. Processes in which reaction gases or temperature-adjusted, evaporated liquids build up a pressure in the reaction space can be pressure-controlled very well at constant temperatures via a feed to the chamber. Furthermore, a gaseous reaction component with a correspondingly high pressure can be applied at least once per test via the feed lines of the pressure-tight chamber. The pressure falling or varying during the reaction can be monitored using a pressure sensor, which can be installed in the discharge-line opening of the pressure-tight chamber, and provides information about the time profile of the reaction.

In a preferred embodiment, the lids have at least one line for feeding or discharging reaction components under e.g. inert conditions. Particularly preferably at least 5 openings are provided, so that different test requirements of the various syntheses can be satisfied simply and quickly in an automated fashion by separate feeding or discharging substance connections. In the simplest case, capillaries may be welded into the feeding or discharging openings, in order to avoid possible leak points. In the case of thicker-walled pressure-tight lids, screw-thread connections may be provided for simple fitting of various equipment components or different sensors. The feeding or discharging connection lines provide the possibility of coupling to the external and associated supply devices, e.g. distributor units and the monitoring unit of the parallel reactor system. It is furthermore possible to connect a plurality of individual reactors in series, so that further consecutive synthesis steps can be performed directly one after the other. Individual reactors, which are connected in series one behind the other, additionally provide the possibility of continuous cascade operation.

A further preferred variant of the lid involves the implementation of a stirrer. This variant provides the possibility of using a central opening of the lid and fitting a stirrer for intense mixing of the products that are used. The stirrer is e.g. connected to the drive system via a coupling, or is connected directly to a motor. Fitted between the lid attachment opening and the coupling is a component (casing) for holding the stirring-shaft seal and, if required, a stirring-shaft bearing, so that it is possible to operate under elevated pressure. The coupling may be a force-fit or magnetic coupling. Another alternative is to install a magnetic stirring drive. Via a connection of the motor drive to the monitoring unit, the effective motor torque and therefore the stirring power can be determined at any time from the current drawn or the variation in the current. This particular variant of the lid embodiment is particularly suitable for reaction studies with varying and relatively high viscosity. The stirring drive in conjunction with e.g. a magnetic coupling improves the leak-tightness of the reaction container, and therefore has advantages when carrying out tests with particularly toxic substances. If high pressures (>200 bar) also prevail in the reaction space, then an external magnetic stirrer drive provides advantages in terms of leak-tightness and the stirring power that is delivered. Reaction studies in the high-viscosity range with a viscosity in excess of 5000 mPas require a high stirrer power in order to ensure uniform mixing in the chamber module. High stirrer powers at high viscosities and, at the same time, high pressures and temperatures, are achieved e.g. with an external magnetic coupling. In this case, even if the influence of temperature affects the performance of the magnets, a sufficient distance between the magnet and the hot lid surface is provided in order to safeguard the stirring power. Furthermore, in the case of an external magnetic coupling, there is scarcely any limitation in terms of the overall size of the coupling, so that a high stirring power can be achieved. A further opening is used e.g. to install a thermometer protection tube which extends into the pressure-tight chamber and makes it possible to fit the temperature sensor. In this particular embodiment, a thermocouple is connected to the monitoring unit via a sensor circuit board, so that monitored temperature adjustment of the test run with an internal temperature sensor is possible. The temperature sensor may be firmly connected to the lid, so that a thermometer protection tube is unnecessary, in order to avoid a time lag for the actual substance temperature during a test.

A further preferred embodiment of a lid has an additional hollow-shaft stirrer for gasification in the reaction space, and optionally for delivering gas below the liquid level of the substance quantities that are used in the chamber. At the shaft head, the hollow-shaft stirrer has a stirring-shaft opening, and there is an additional seal both above and below this stirring-shaft opening in order to seal the reactor and to inject the gas to be introduced, or alternatively a liquid to be introduced. The stirring-shaft head and the two additional stirring-shaft seals are located in a separate small casing, or are integrated in a so-called shaft seal with a barrier clamping ring. This makes it possible, while the stirring mechanism is operating, for a pressurized gaseous or liquid component to be delivered through the hollow shaft of the stirrer directly into the reaction mixture in the individual reactor, and for it to be intensely mixed directly. A further advantage can be achieved by delivering a gaseous or liquid component as an entrainer directly into an intensely mixed reaction melt. In both applications, as well as in particularly small test batches with small volumes, large surface areas and good substance transfers are produced which are advantageous in terms of processing.

Also preferred is an embodiment of a lid which has a double-walled stirrer shaft, to which a stirring blade immersed in the substance is fitted at the lower shaft end, with direct and assisted temperature adjustment of the reaction mixture in the reaction space of the individual container taking place by means of heat conduction between the stirring shaft and the stirring blade. In particular when carrying out exothermic reactions with extremely high heating powers, it may be necessary to provide, besides the associated cooling unit according to the invention, an additional space-saving cooling facility in the reaction space (chamber) of the individual reactor. The temperature-adjustable shaft stirrer additionally has the advantage that the heat-transfer power at high speeds of the stirrer is promoted by the concomitant increase of the Reynolds' numbers and that, owing to the design, the heat-transfer resistances in terms of the wall thickness are small. The temperature adjustment may be carried out electrically or with heat-transfer oils or, in the special case, cooling by sols (<20° C.), cooling water or air is carried out. To feed the liquid heat exchange media, a special connection unit that functions according to the rotor-stator principle is provided on the individual container, preferably outside the lid. The stirrer geometry may be optimized and adapted according to the processing task.

Furthermore preferred is a variant of a lid which has an internal condenser with external cooling connections, the cooler being either firmly connected to the lid or screwable. The internal cooler has advantages in terms of several process requirements. In particular when carrying out a reaction close to the boiling point of one of the components involved in the synthesis, the evaporating reaction component can be recycled to the synthesis during an exothermic reaction via reflux and, at the same time, large amounts of heat can be dissipated from the synthesis. Furthermore, possibly occurring gas components can be removed continuously from the reaction process and, where appropriate, entrained vapor constituents of reaction components involved in the synthesis can be condensed from the off-gas flow. The internal condenser preferably has additional cooling fins which, in particular embodiments, extend to just above the liquid synthesis working volume and, in very special cases, even extend into the working volume of the reaction container. The lower end of the internal cooler may carry cooling fins on the outer cylinder, in order to form the largest possible cooling area for the condensation or cooling process.

A lid may also, in particular, be provided with an external condenser. The advantage of the external condenser or cooler consists in the larger space available outside the reaction chamber. Therefore, the cooling area for reflux or condensing-out an off-gas flow can be made as large as desired. If the test requires a lid with a stirring instrument, the external condenser may also be fitted laterally to an enlarged feeding or discharging opening in the lid, or to the chamber. In a special variant of such a lid, the external cooler is replaced by a thermal separating column.

Likewise preferred is a lid variant with a dosing device for liquid substances or liquefied gases, in conjunction with a so-called annular-gap dispenser, which has a movable piston with a groove made in it, which forms the mobile annular gap. In the filling position of the mobile annular gap, in the retracted state of the piston, the static part of the concentric annular gap lies, at the same level as the mobile annular gap, in the casing of the dosing device. The static annular gap can perform the function of a substance-feeding bypass, when the process requires continuous flow through the annular gap. The movable piston is equipped e.g. with at least three seals, in order to seal the loading point from the surroundings and from the process space. This special particular lid with a dosing device provides the possibility of dosing, reproducibly and volumetrically, the smallest of liquid substance quantities with a volume <5 ml, preferably a volume <1 ml, particularly preferably volumes under a drop size <0.1 ml, in a pressurized, temperature-adjusted space of the individual reactor. For syntheses in which one or more vapor reaction components are contained in the gas space of the reactor, and they are essential for the reaction process and the reactor internal pressure, it is particularly advantageous to use the lid with a dosing device as an annular-gap dispenser. The annular-gap dispenser operates in a reciprocating fashion; the cycle frequency of the strokes may be selectively specified or controlled via the reactor internal pressure or the progress of the synthesis. For control, use is made of a process control system or other control units. It is possible to terminate a process when the maximum number of dispenser strokes is reached. As soon as the piston with a dynamic annular gap is filled with substance and is moved from the loading position into the delivering position, in the retracted state, and the filled annular gap is in the reaction space of the individual container, the quantity of substance to be dosed which it holds can be delivered and fed to the respective process. When larger volumes are being dosed, this is preferably done by dispensing drops and, in the case of the smallest of volumes, under specific drop volumes, in particular by evaporation in the temperature-adjusted gas space of the individual reactor. The lid with a dosing device in the form of an annular-gap dispenser can also be used for sampling the smallest of substance quantities, if the excursion of the piston with a static annular gap is increased accordingly. It is obvious that the dosing device may also be positioned, as an individual component, as a sampler directly on the bottom of the pressure-tight chamber. The piston may be driven electrically, pneumatically or hydraulically. As a sampler, the annular-gap dispenser is used in the reverse sequence. The piston with the annular gap moves into the reaction liquid, is hydraulically flooded therein and is subsequently moved to the filling position of the annular gap. There, the sample quantity that has been taken up may be displaced with a carrier liquid or a carrier gas, which is passed over the static part of the annular gap, and transported to an analyzer.

A preferred further design of the lid is provided with a sampling device and an internal riser tube. The sampling device consists of a combination of two controlled three-way valves or ball cocks, two controlled two-way valves and a vertically standing check valve with a float, which need to be switched in an established sequence, optionally in an automated fashion. Automatic sampling during a process is necessary in order to track, monitor and control the progress of the reaction during the synthesis time by means of analysis. The sampling device is attached e.g. to a riser tube, which extends into the pressure-tight chamber until it is inside the stirred reaction mixture of the individual container. The riser-tube end protruding into the chamber is open at the lower end, while the valve combination is attached to the other end of the riser tube, outside the reactor space. For controlled sampling, a plurality of valve switching procedures taking place in succession are necessary.

In a further preferred embodiment, the lid has a heating device.

A preferred variant of the device according to the invention is characterized in that the heating instrument and/or the cooling instrument of the chambers is/are designed so that they can be separated from the chambers.

For temperature adjustment of the pressure-tight chambers, for example, a heating instrument and a cooling instrument are provided at the same time.

The instrument which first encloses the pressure-tight chamber is advantageously selected according to the process requirement. When endothermic processes are to be studied, it is advantageous to provide the heating instrument in direct contact with the pressure-tight chamber, so as to reduce any time lag of the heating process.

When processes that exhibit an exothermic nature are to be studied, the time lag before the energy dissipation sets in can be shortened if the cooling instrument is in direct contact with the pressure-tight chamber.

The energy supply by means of the heating instrument is preferably operated electrically. The heating instrument is e.g. a hollow cylinder, closed on one side, whose inner contour is matched to the outer cylindrical contour of the pressure-tight chamber. On the outer circumference, the heating instrument has e.g. a spiraling groove to hold an electrical resistor wire, which is operated at medium voltage (220 V), although preferably at an electrical voltage of <100 V, particularly preferably at <60 V. The electrical heating wire furthermore encloses the entire cylinder of the heating instrument.

In order to permit a high temperature gradient between the pressure-tight chamber and the heating instrument, and to make it easy to attach the electrical heater, a particular embodiment is selected in which a circumferentially spiraling channel is designed in two sections and is matched to the shape of the heating wire, so that the heating wire is in optimum metallic contact with the support. The heating instrument furthermore consists of, in particular, a material having a higher thermal conductivity than the material of the chamber experiencing the pressure. The ratio between the thermal conductivities of the heating instrument and of the pressure-tight chamber is, in particular, greater than 1, preferably greater than 5 and, particularly preferably, greater than 10. The combination of an electrical heater and a high thermal conductivity of the material of the heating instrument makes it possible to achieve a maximum heating gradient for the chamber to be heated, which guarantees short heating times for the process to be studied. Preferred materials for the heating instrument are copper, brass, aluminum or noble metals having a high thermal conductivity. In particular embodiments, the heating instrument may be designed as a component of the pressure-tight chamber and in one piece.

The cooling instrument is, for example, in the form of a tube whose wall has cavities for a heat exchange medium to flow through. In a preferred embodiment, the cooling instrument completely encloses the heating instrument in the cylindrical region, so that there is close contact with good heat transfer through the heating instrument and the pressure-tight chamber. The material of the cooling instrument is at least as thermally conductive as the material of the heating instrument. In a further preferred embodiment, the advantage of the separate heating and cooling instruments can be seen when, for reasons associated with the process, the cooling instrument directly encloses the pressure-tight reaction chamber and the heating instrument encloses the cooling instrument. This may be advantageous in the case of extremely exothermic processes, in order to further improve the dissipation of the reaction heat. The energy supply via the heating instrument can be terminated quickly in this particular embodiment. The wall of the cooling instrument is in this case hollow, so that a liquid or gaseous coolant can flow through the cooling instrument. To improve the temperature adjustment, the heat-transfer area in the wall cavity of the cooling instrument is formed by fins, or preferably by a spiraling channel, or, particularly preferably, by a multi-section spiraling channel. In the form with spiraling multi-section cooling channels, the cooling instrument can be operated simultaneously with air and/or water.

The heating/cooling instrument provides the possibility of achieving very high heating rates and, at the end of the test, high cooling rates, so that the reaction process is hindered only slightly, or not at all. The known devices do not offer this advantage. This effect is so serious in the case of suboptimal configuration of the temperature adjustment system, in particular in the case of parallel miniaturization, that meaningful chemical and process results cannot be derived from the test when the reaction times are very short. The averaged temperature change (heating or cooling rate) of the heating/cooling system is, in particular, at least 5° C./minute, preferably 10° C./minute and particularly preferably at least 15° C./minute.

Another possibility, however, is temperature adjustment by using liquid nitrogen or the possibility of attaching a cryostat, in order to dissipate quantities of heat with high temperature differences. In a particular embodiment, the cooling instrument may be a component of the reaction chamber. This leads to somewhat lower heat-transfer resistances and improves the system-specific cooling performance, albeit at the cost of flexibility.

In another preferred design of the experimental device, the sample vessels are designed integrally with the chambers.

Particular advantages when handling small test quantities are provided by a particularly preferred embodiment, in which the bottoms of the sample vessels are essentially planar and are oriented by an angle $\alpha$ of 5 to 60° with respect to the horizontal.

In this case, the holding unit in which the individual reactors are positioned is supplemented by hinges or by swivel joints, so that a desired tilt angle can be set manually. In this way, tests can be carried out in the individual reactors with a total batch quantity that is less than 1.5 ml, without thereby modifying the technical layout of the reactor system.

To reproduce methods with a plurality of consecutive method steps, it is particularly advantageous to connect two or more individual reactors in series with one another via their substance feed lines and their discharge lines.

In a particularly preferred variant of the aforementioned arrangement, two neighboring individual reactors connected in series with one another are in each case arranged at a different height.

As an alternative, or in addition, two neighboring individual reactors connected in series with one another can in each case be operated at a different pressure, and a delivery assembly can be connected into a connecting line between the individual reactors.

Series connection of the individual reactors makes it possible, in particular, to address technical processing questions during the parallel synthesis of temperature-sensitive substances, and to improve the synthesis results in terms of selectivity. In this case, it may also be advantageous for a downstream individual reactor to have a larger equipment volume than the one upstream. Furthermore, it is possible after a defined synthesis time to completely avoid the subsequent cooling phase or cooling time of the reaction mixture, by transferring the substance to the downstream individual reactor in a prepared and cooled neutral liquid.

For simplified feeding and discharge of process substances, the individual reactors are connected to a substance distributor unit.

Substance distributor units are needed in order to permit automated study of synthesis processes on the small scale, from chemical, physical or processing standpoints. Owing to the often very complex equipment for a realistically fast study and with varying tasks, a compact embodiment is advantageous and necessary. If such studies are carried out at high pressure (up to 400 bar) and high temperatures, then it is particularly difficult to achieve accurate, reproducible measurement results because there may still be many possibilities for leakage in the complex parallel test equipment. The person skilled in the art knows that any conventional releasable connection of substance lines has a leakage rate, and the respective leakage quantity multiplied by a high equipment number of releasable pressurized connections has the effect that test results may not coincide and reproducible measurement results are not achieved. This becomes noticeable, in particular, with the very small substance volumes (10 ml) that are typically used, and can lead to unusable test results. Owing to the substance distributor unit that is preferably used, the number of releasable connections can be reduced to the actual point of connection to the individual reactor. A substance distributor unit is preferably a stack composed of at least three sheets (e.g. metal panels), the sheets having lengthwise holes or circular openings. Channels are formed in the stack, e.g. by a plurality of lengthwise holes. The channels lying next to one another are not connected to one another in the horizontal of a central sheet. The central individual sheet has a cover sheet on the upper and lower sides, with circular openings for the feed and discharge of the substances being made at the upper and/or lower side of the cover sheet, if so required. The substance distributor unit consists, in particular, of at least two differently thick sheets, the central sheet with its slots as channels being thicker than the two covering sheets with the feeding and/or discharging openings. The horizontal separation of the slots of the central sheet is dimensioned in such a way that complete surface soldering of the two covering sheets to the central, slotted sheet results in at least one sealed pressure-tight feeding and/or discharging channel for process substances. The resulting sheet stack can be used as a substance distributor unit for the chemical process, and also as a distribution unit for heat exchange media. A multiplicity of smaller discharging openings branch off from the distributing channels to supply the individual reactors. The feeding flow cross section of the openings is as large as the flow cross section of the distributing slot in the central sheet. The flow cross section of the discharging openings are a multiplicative factor smaller than that of the feeding ones. A preferred embodiment of the substance distributor unit is implemented by direct coupling of a controllable valve to the discharging opening of a distributing sheet channel. In this case, controllable valves or ball cocks may be screwed directly into the cover sheet and sealed, or welded onto it.

The substance distributor unit may consist of various materials, so that temperature, pressure and corrosion effects are sufficiently taken into account. The substance distributor unit is preferably produced in such a way that it forms a solid unit; in particular embodiments, the unit is assembled from screwed sheets, so that the channels made in it are separated from one another, and sealed, by elastic seals.

In principle, a distinction is made between two particularly preferred embodiments of the substance distributor unit. In a particularly compact embodiment, the distributing channels are located in a plurality of planes above one another, and are characterized by a straight row of outlet openings; in the previously described embodiment, in flat design, the distribution channels are located parallel next to one another in a plane, and the discharging substance outlet openings are distributed irregularly on the front and back sides of the substance distributor. The parallel separation of the distribution channels in the horizontal position should, for technical reasons relating to pressure, amount to at least one channel width so that, in particular, economic soldering methods or welding connection methods, such as laser or electro-beam methods, can be used to connect the sheets. The substance distributor unit in compact design consists e.g. of at least 5 plates or panels, with the panels being structured differently. "Structuring" is intended to mean differently large, circular openings (bores) or long and short slots (lengthwise holes). If the panels (sheets) are positioned above one another and the contact surfaces of the panels are irremovably connected to one another e.g. surface-wide to form a panel packet, then the structures made in them give rise to horizontally and vertically running rectangular flow channels (cavities) with different flow cross sections, which intersect in various sections, but in different planes separated from one another, at an angle of 90 degrees. The flow cross sections become smaller and smaller, starting at the main inlet point of the respective distribution channel up until the discharge point or up until the outlet point, where a special controllable plate valve is located. This ensures a uniform distribution in the substance distributor unit up until the discharging valve of the liquid or gaseous media.

Main lines for various gaseous or liquid energy carriers such as water, air or cooling sols as well as gaseous or liquid reaction substances may be attached to the main point of input into the substance distributor unit. Dimensioning of the flow cross sections is carried out through suitable selection of the sheet thickness and by establishing the surface structures which are formed.

To make it simpler to carry out tests in the case of parallel reactions, a modified preferred device has been developed, in which the substance feed lines and substance discharge lines, and optionally pressure reducing lines (vacuum line), are connected to one of the substance distributor units described above. In this way, the feed lines and discharge lines, and optionally pressure reducing lines of the individual reactors are connected selectively to one another and/or to a main substance feed line, a main substance discharge line and, optionally, a main pressure reducing line.

Particularly preferred is a substance distributor constructed from a plurality of, in particular at least three, metal sheets which are firmly connected to one another and which lie above one another in layers, and in which substance channels and, optionally, vacuum channels as well as inlets and outlets are made.

In a preferred embodiment of the substance distributor, the uppermost sheet and/or the lowermost sheet in each case has/have inlets for the external supply lines and outlets to the reactor lines, and the middle sheet(s) has/have connecting channels.

Owing to the flat design of the substance distributor, it is suitable in particular for the further mounting of additionally required processing equipment components, e.g. containers for storage, delivery devices, on-line analysis, and interface modules for coupling sensors and actuators to the control unit. In particular, the compactness and the number of unsealed connection points are reduced, which leads to a high availability of the overall parallel test installation. This aspect is not taken into account in the known, less compact devices. The flat substance distributor with adapted equipment components may also be regarded as a supply unit, and is generally allocated a single reactor.

The preferably flat substance distributor may be combined with the compact substance distributors, so that a flat substance distributor is allocated to the individual reactor and the compact substance distributor represents an upstream supply unit.

To supply the in particular parallel-operated individual reactors, compact distributor units are needed so that a space-saving equipment parallel reactor system can be constructed, in order to be able to study the specific requirements in terms of a chemical or realistic processing question. Besides substance distributor units, an electrical distributor unit is also used, in particular, as an interface module. Flat and compact distributor units are connected in particular to a monitoring unit, the term "monitoring unit" being intended to mean e.g. a process control system with control software, including the associated sensors. For regulation, the off-the-shelf algorithms that are known per se may be used in this case, for example with process models being used. In the particular case, the process control system may be replaced by intelligent individual regulators in accordance with the test requirements. The actuators needed for controlling a process may be positioned on the supply unit and/or the distributor unit. The connection to the monitoring unit takes place via electrical connecting lines. A distributor unit may be a component of a supply unit, in which case the distributor unit has at least one input point and a multiplicity of associated outlet points in order to supply a plurality of individual reactors connected in parallel or sequentially. One supply unit is preferably provided for a multiple of two individual reactors.

The supply unit is used to hold various processing components, in order to carry out a test rationally, in an automated fashion and reproducibly. Examples of processing components include storage containers, filter equipment, thermal separation units, heat exchangers, delivery and dosing assemblies as well as safety instruments, such as safety valves and rupture disks. Sensors needed in the region of the supply unit, and also on-line sensors, may furthermore be installed in order to obtain as many different measured values as possible from the processes in the individual reactor.

Processing equipment components require various supply connections to fulfill their function, e.g. for electrical energy, cooling by means of water or air, applying pressure to the product space with inert gas, and optionally further safety instruments such as pressure relief valves or rupture disks.

For these reasons, and in order to permit a compact, space-saving design, distributor units as described above may be mounted on the supply unit. For the connection to the monitoring unit, electrical distributor units are provided, which make it possible to combine the electrical connections needed for control and regulation, of the actuators and the sensors, in the form of individual cables and to produce the connection to the monitoring unit with multi-stranded cables.

In order to implement a compact design of the device according to the invention, a particular embodiment of controllable valves for working ranges up to high pressure ranges has also been developed, for automated operation of parallel syntheses. These are so-called plate valves, which have an integrated control head.

These pneumatically drivable plate valves are fitted e.g. on each outlet point of the compact substance distributor units and, in a preferred embodiment, they are designed as a detachable stack of individual plates. The detachable plates of the valve are likewise structured, the structuring being restricted essentially to circular openings offset to a varying degree. A few plates of the valve have horizontally running channels. These are used for the product feed or discharge. The valve has a head plate, in which a pneumatically controllable sealing cylinder with a fitted valve spindle is inserted. The plates or panels of a valve are, in a particular embodiment, equipped between them with replaceable elastic seals, the seals generally fulfilling two functions. The dual sealing function consists in an effect of sealing the product space of the valve from the controlling pneumatic space at the head of the valve and, at the same time, for sealing the plates from one another and externally from the atmosphere. The plate stack of the valve is connected directly to the substance distributor unit by screws. The surfaces of the pneumatic cylinder, which is used for control, i.e. for moving the valve spindle up or down, or for opening and closing the valve, are larger by at least the factor 10 than the pressure-receiving active surface of the valve spindle in contact with the media, which results in an active surface pressure ratio. During the closing movement of the pneumatic cylinder with the valve spindle, the lower end of the valve spindle is pressed into an elastic seal, so that the extended outlet channel of the substance distributor unit can be closed and the substance flow path is interrupted.

In a preferred embodiment, the active surface pressure ratio equals is >10 and, in another particularly preferred embodiment, the active surface pressure ratio is >50.

So that the valve switches automatically to the desired safe state if the pressurized air fails, a space-saving disk spring is fitted below the cylinder in a particular embodiment. Because of the sheet-type plate structure, the valve is easy to modify so that, in other embodiments, it can be designed as a manually operated, hydraulically controlled or electromagnetically controlled valve. The substance distributor unit with the necessary valves can be expanded by a multiple of the number of main channels. The working range in terms of temperature and pressure corresponds to the height demands of parallel individual reactors.

The miniaturized embodiment of the plate valve with an integrated drivable head has very short response times owing to the small control-air spaces, so that extremely short switching times can be achieved.

In a particularly preferred design of the device according to the invention, consequently, the outlets of the substance distributor unit are connected to the feed lines or the discharge lines of the individual reactors via switchable or regulatable valves.

The valves are in this case, in particular, connected directly to the substance distributor.

The valves are preferably designed so that they are pneumatically controllable. Particularly preferably, the valves are configured to be self-closing if the pneumatic control fails.

The aforementioned monitoring unit preferably also controls or regulates the speed of the stirring devices and/or the position of the valves, in addition to the temperature and pressure.

To prevent contamination of the chambers of the individual reactors, in a particular variant of the device, the sample vessels are designed so that they can be separated, and are additionally provided an additional sealing means either between the upper rim of the sample vessels and the chamber wall or between the lid wall and the top edge of the sample vessels.

To prevent the sample vessels from rupturing, in the above embodiment, pressure compensation channels are provided between the reaction space, which is sealed by the sample vessel, and the intermediate space between the sample vessels and the chamber wall of the individual reactors.

The monitoring unit is preferably a constituent part of a process control unit, and represents e.g. a temperature sensor. Furthermore, the monitoring unit is additionally used as a pressure sensor. The monitoring units can be used in a sufficient number per reactor system and organized in parallel, the connection to the actual process control system and a connected computer with appropriate software to regulate and control the chemical, physical and technical processes being carried out via printed circuit board technology that is known per se. With conventional multi-stranded ribbon cables, e.g. monitoring units and actuator units are connected to the process control system and analog and digital signals are interchanged, signal values also being temporarily processed mathematically in a process-specific way, so that new control signals or instructions are generated. Digital signals are used predominantly to control adjustment valves and as monitoring signals. It is particularly advantageous to use a plurality of special printed circuit boards, positioned in immediate proximity to the processing units, e.g. the parallel reactors and/or the supply units. In this way, in particular, cable paths can be kept very short, monitoring units can be replaced rapidly when the task varies, and the measurement accuracy of the sensors as well as the reproducibility of the studies that are carried out are increased substantially. In addition, recorded analog signals make it possible to calculate further conclusions and discoveries concerning the process taking place. An important example of calculating substance-specific parameters is the viscosity, which can be determined directly from the change in the current drawn by the motor with the stirrer. In particular, it is novel for the person skilled in the art that, even in the case of a simple magnetic coupling with a separate internal magnetic stirrer, it is possible to measure a difference in the current drawn at the motor, and direct conclusions regarding the substance-specific viscosity change inside the reactor during the synthesis are possible.

In the case of very simple applications, the process control system may also be a regulator or a multi-channel regulator, although substantial process information may be lost. In particular in the case of carrying out miniaturized, parallel and realistic tests with small substance quantities under extreme conditions, such as high pressures and high temperatures, good reproducibility is a fundamental condition, i.e. only little or no human intervention should take place. Intervention by different individuals can lead to errors and vitiate the test results.

This leads to a process control system with specific software solutions in accordance with the inventive equipment components. The novel software solutions are used at the same time to reinforce the equipment features of the device according to the invention.

A further substantial aspect in modern research & development is to carry out processes reliably when conducting realistic miniaturized parallel tests. It is therefore necessary to have an integrated safety concept, as described above, which reduces the risk potential and safeguards personnel as well as the environment.

Varying tasks require formulation-like software structuring as a function of the different device parts according to the invention. The individual software units are combinations of regulating functions and/or control functions. They are stored e.g. in a software library so that, in order to carry out a specific test procedure, the user can take the necessary software units from the library, combine them together and structure them as required, and connect them in series with one another according to the required procedure. The user is also provided with the opportunity to control and regulate all the individual reactors with the associated equipment on the supply unit in parallel with the same parameters, although it is optionally also possible to control and operate all the parallel units with different parameters.

A few of the software units suitable for operating the device according to the invention are listed below by way of example, and specific features are described in connection with the aforementioned system components of the reactors.

1. System check: This program module is used to initialize the system and to ensure the mode of operation, insofar as the distributor units receive all the necessary media via the supply lines. All the controllable valves of the supply unit and of the distributor unit are automatically placed in a basic position. The user is prompted to carry out various checks and to confirm that e.g. the starting substances have been put into the substance stores on the supply unit, or also partially into the individual reactors. The media supply lines (pressurized air, nitrogen, cooling water, sols) that are attached to the distributor unit are then checked, in order e.g. to ensure temperature adjustment of the individual reactor. A verification procedure is then started in order to send discharging toxic substance flows for treatment or to a disposal unit. If all the verifications and checks turn out to be positive, the parallel system is enabled for further use, so that the software unit described below is started.

2. Seal testing: This software unit is used to ensure that the individual reactor and the associated components are leak-tight. The aeration valves of the individual reactors to be checked and/or the pressurized system components are closed; the nitrogen valves are opened. Once the preselected check pressure has been built up, or at least after a firmly stored or programmed time constant has been reached, the nitrogen valves are closed. If the check pressure has not been reached, then the decision can be made whether to continue the pressure check with this pressure, whether the entire check will be repeated, or whether the corresponding reactor unit should be ventilated and excluded from the further parallel procedure. Once all the check pressures have been reached, then the actual pressure check begins. After a specified settling time has elapsed, the initial pressures that are reached are stored and the leakage rates are calculated from the pressure drops. The initial pressures and the leakage rates are displayed and stored. The result is displayed in a dialogue interface (initial pressure, final pressure, difference, status of the reactor). If e.g. it is found that one reactor unit has an excessive leakage rate, then the user can exclude the individual unsealed reactor from the further procedure, and continue the test program with the other individually controllable parallel units. The procedure described here demonstrates the advantage of individually drivable individual reactors. The parallel reactor system need not be shut down completely if there is a faulty individual reactor, so that an efficient parallel procedure is possible.

3. Inerting 1 (vacuum procedure): This software unit is used to initialize the reactor unit. The aeration valves of the selected individual reactors are closed, and attached vacuum valves are opened for a set time and/or until a defined pressure has been reached. The vacuum valve is then closed and an inert-gas valve is opened for a defined period, or until a defined pressure has been reached. The inert-gas valve is then closed and the process begins with re-opening of the vacuum valve. This process is repeated as often as has been specified by the user. After the last run, the aeration valves are opened and the pressure is set to the predetermined final value. Final position of the valves: All valves closed. All the valve switching processes take place synchronously. Once the inerting has been carried out, the procedure continues to the next software unit.

4. Inerting 2 (displacement method): This software unit is used for further inerting of the individual reactors according to the displacement principle. The aeration valves of the selected individual reactors are opened and the nitrogen valves are opened for a set time which, however, is substantially longer than for the inerting by the vacuum procedure. This is followed by the next software unit.

5. Preliminary inert gas pressure: This software unit is used to set a defined inert gas pressure in the individual reactor. The inert-gas valves of the selected individual reactors are opened, and they are closed after a pressure defined by the user has been reached. A waiting time is now started. After the waiting time has elapsed, the operation is terminated. The individual reactor is ready for operation.

6. Limit values: The software unit is used to change limit values, e.g. temperature, pressure, rotational speed etc., at particular times during the run and, in the event of non-compliance with a set limit value, initializes a program to terminate the current test.

7. Stirring: This software unit is used to a specify, monitor and display the setpoint speed of the stirrers, if they are used. In this case, the setpoint speed, actual speed and torque are displayed.

8. Temperature adjustment: This software unit enables accurate temperature adjustment of the individual reactors, or of other temperature-adjusted system components, by specifying a setpoint temperature, a maximum allowed setpoint-actual temperature difference and a selectable temperature rise gradient, with which heating or cooling is to be carried out. The gradient time and the setpoint and actual temperatures are displayed. The temperature adjustment is a special software unit, which permits synthesis with a high reaction heat (exothermicity) at a constant internal temperature. The inventive cooling unit (32) has two separate cooling channels and offers parallel connection of two coolants (e.g. air, water). In particular when carrying out especially exothermic reactions and trying to find optimized reaction accelerators, it is necessary to apply strong and/or weaker cooling automatically depending on the activity of the accelerators, so that the internal temperature of the individual reactor remains constant. When a temperature controller detects that the internal temperature rises because of the reaction heat, it uses a timed valve to switch the coolant with the lowest heat capacity to the first cooling channel of the cooling unit for a defined time. If the internal temperature difference has not been compensated for within a predetermined time period, the second valve attached in parallel to the cooling unit is automatically connected to the second cooling channel of the cooling unit in a timed fashion, so that a cooling medium with a greater heat capacity then regulates the internal temperature of the reactor unit in parallel with the first coolant. In this way, a reactor unit can be operated at a constant internal temperature even if the release of the reaction heat as a function of time is unknown. Excessive sub-cooling and therefore interruption of the reaction does not take place.

9. Dosing: This software unit is used to control a dosing unit in the reactor lid, at least two dosing units being combined, for example, with a multi-position valve for parallel operation of the individual reactors. The multi-position valve is used to drive the corresponding individual reactor accordingly, in order to supply the dosing unit with substance via a central supply. The dosing unit can then deliver a defined volume into the e.g. pressurized individual reactor, so that the desired dose can be preselected through the number of strokes of the dosing instrument. This offers several possibilities to comply with different process requirements. The dosed quantity of substance can be obtained by pre-setting the number of strokes of the dosing piston, and a pressure sensor and corresponding switching contacts can be used to carry out pressure-dependent control of the individual reactor. The software unit also provides the possibility, in addition to the pressure-controlled dosing, of terminating the individual test by specifying a maximum number of strokes. In order to limit reaction rates and the time taken by the synthesis, and to study the essential reaction sections, the option is provided to specify a number of strokes per unit time in a pressure-controlled fashion. The corresponding values are specified. The pressure, number of dosing strokes and run time are displayed.

10. Test termination: The software unit is started after reaching predetermined criteria that describe the test as completed. Each integrated and operated individual reactor is put into a defined final state, which is to say the individual reactors are cooled, the internal pressure is reduced in a defined way, and toxic components possibly remaining in the gas space of the individual reactor or constituents dissolved in the reaction substance can be removed under a reduced pressure and sent to a disposal facility.

11. Data transfer: This software unit transmits all the important test parameters and test results to a superordinate database after the end of the test.

12. Completion report: This software unit signals to the operator that the test in the individual reactors is completed, and that the reaction substances can be removed.

The invention furthermore relates to a method for carrying out experiments in parallel on process substances by employing the device according to the invention, wherein at least the following method steps are carried out:
 a) checking the supply lines to the individual reactors,
 b) introducing the test samples into the sample vessels of the individual reactors,
 c) closing and seal-testing the individual reactors,
 d) optionally inerting the reaction spaces of the individual reactors by means of pressure reduction and admission of inert gas,
 e) optionally setting up a preliminary inert gas pressure,
 f) establishing the method parameters, in particular limit values and optionally time gradients for the pressure, the temperature and, optionally, the stirring speed of the test substances,
 g) regulating the process temperature, and
 h) carrying out the test, optionally while adding other test substances.

The device according to the invention and the method provide the advantage over the prior art that their modular structure permits fast and economic adaptation to the technical requirements resulting from any task. The device provides the possibility of carrying out experiments even under extreme test conditions, while at the same time complying with the technical rules to guarantee safety. Another advantage over the known prior art is the possibility of driving each individual reactor separately when carrying out the method, in particular by supplying or dissipating energy. In this way, for example, it is even possible to handle strongly exothermic reactions that are liable to run away. This is not possible with known devices of the prior art. The substance distribution unit makes it possible to distribute substance and energy flows to all the reactors in a very small space. The special sheet-type structure of the substance distributor and the use of very compact valves, which are suitable for extreme conditions, drastically reduce the number and the length of the necessary capillary lines and necessary connecting elements, which leads to a better overview in the case of a multiplicity of individual reactors and therefore to safe handling.

A particularly preferred configuration of the device is characterized in that the device is modularly constructed, the individual reactors the heating instrument, the cooling instrument, the monitoring unit, the stirring device, optionally the substance distributor unit and optionally the supply unit, being designed so that they can be changed independently of one another.

In general, the device provides the possibility of rationalizing the conventional laboratory technique and simultaneously carrying out chemical tests reproducibly from processing standpoints, and substantially accelerating the overall development time for new methods. In this case, the modularly constructed device according to the invention can be regarded as an automated, miniaturized system for carrying out tests completely.

In order to achieve all this, it is helpful to miniaturize the modules and to configure them in such a way that different reaction test procedures can be carried out straightforwardly, without thereby changing the maximum possible working limits of the overall modularly constructed device. Efficient optimization of such chemical processing tasks is meaningful only if all the equipment and control-technology modules are configured to match one another, so that the resulting combinations do not have a limiting and restricting effect on the various fast-running synthesis processes and they permit all the expedient degrees of freedom in terms of the chemical processing tasks, without thereby compromising the applicability of the relevant results in terms of a production process. In this case, it is advantageous to limit the degree of miniaturization to batch sizes (total volume of the sample vessel) of from 0.5 ml to 50 ml, and reduction to a batch size of from 1 to 20 ml is particularly suitable. Batches containing more than 50 ml are expensive, and sometimes cannot be implemented for new substances since the product quantities for parallel series tests are unavailable. When checking the use of particularly expensive starting substances to develop new products, or alternatively for quality control of expensive e.g. pharmaceutical or biological active agents, this degree of miniaturization is particularly suitable. Applications for conventional analysis work, in which extensive sample provision or preparation is necessary, can be carried out more economically with the device according to the invention. The importance of a correct and suitable degree of miniaturization becomes clear when processing shear-sensitive substances, which coagulate under shear effects, and inevitably clog channels, valves, heat exchangers etc. and prevent the tests from being carried out unimpaired.

A supply unit equipped according to the test requirements provides the possibility that, inter alia, a fast exothermic chemical reaction can be carried out while omitting the heating phase, so as to permit the start of a reaction with the educt supply and optionally reactant dosing synchronized at the same time with a defined temperature and pressure. In particular in the case of fast reactions, it is necessary to ensure that the majority of the reaction batch has not already reacted during the heating phase, and the actual parameters in question do not lose relevance at the process level for the subsequent production scale and cease to be applicable. This possibility is not available without restriction in devices which correspond to the prior art.

The preferred oblique position of the entire reaction block provides the possibility of further reducing the use of sample quantities consisting of liquid and solid with efficient mixing. In this case, the volume of the reaction batch can be reduced to <5 ml, preferably <1 ml. In these cases, it is particularly advantageous to adapt to the test requirements in a straightforward way by changing individual modules. The batch size also essentially determines the detection of an exothermic reaction. The overall mass of the surrounding chamber units, heating units and cooling units must not have the effect of suppressing the temperature rise due to the reaction, with the result that the exothermicity cannot be detected and evaluated.

In the reactor modules preferably used in the device according to the invention, it is possible to detect and record the smallest of temperature changes, so that tests can be carried out reproducibly on the miniaturized scale.

In particular, the use of a mass-optimized cooling and heating unit with a two-section spiral cooling channel permits rational compensation of the reaction temperature in the reaction chamber in the following way: cooling can be carried out by first using a coolant with a low heat take-up capacity, and the connection of a second coolant in parallel can be delayed until the cooling power is found to be insufficient, in order to stabilize the process in terms of temperature. This cooling method makes it possible, for the first time, to carry out miniaturized processes for exothermic reactions with small reaction batches (<5 ml). This problem is not solved by equipment from the prior art, and such tasks cannot be dealt with by using parallel batches.

The particular substance distributors make it possible to distribute substance and energy flows to all the reactors in a very small space. The special sheet-type structure of the module and the use of very compact valves, which are suitable for extreme conditions, drastically reduce the number of connection points, and therefore possible leakage points at high pressures, as well as the length of the necessary capillary lines, which leads to a better overview, higher operational safety and therefore to simple and safe handling of the device according to the invention. The special design of the controllable valves that are preferably used, with e.g. an integrated pneumatic drive in the region of the valve head plate, considerably reduces the response or switching times of the valves. Furthermore, for automated uniform test runs of parallel reaction systems, it is necessary to have very many controllable valves which need to be fitted in the smallest of spaces. It is not uncommon to require up to 10 valves per reactor, so that the tailored valve design is substantially more economical and cost-effective than conventional solutions with known valve types.

A further advantage is provided by the supply unit. The additionally required miniaturized reactor equipment peripherals are concentrated on the supply unit, so that a test can be carried out fully automatically. These include various additional miniaturized equipment items, e.g. storage containers, buffers, filtration units, mixer-settlers, on-line analysis, pumps and further valves and the necessary sensors and actuators for measuring physical parameters. The supply unit may also be a component of a liquid handler, and may optionally be positioned in a glove-box. This makes it possible to handle liquids and solids under inert conditions. It is thereby possible to combine the sample preparation directly with the carrying out of parallel tests.

The monitoring unit, e.g. consisting of a sensor and actuator circuit board, can be positioned directly on the supply unit, so as to permit short electrical cable paths. Because of the multiplicity of different sensors and actuators, up to 500 so-called MSR points can be interconnected and routed in bundles via multi-stranded ribbon cables to the process control system. This module technology saves on space and costs, and produces flexibility in the use of different sensors for various tasks when carrying out parallel tests. In particular in the case of varying tasks, it is easy to carry out upgrading or refitting.

The inventive device is essentially used in the field of material and catalyst development. Examples of properties to be studied as a function of temperature, pressure, stirring speed, concentration etc. may include:
- the conversion of a chemical reaction
- the selectivity of a chemical reaction
- the yield of a chemical reaction
- the aging stability of a substance
- the viscosity profile of a liquid substance/a liquid substance mixture
- the energy consumption
- the energy production
- the temperature profile
- the pressure profile
- the solubility
- the corrosion
- the thermal stability.

BRIEF DESCRIPTION OF THE DRAWINGS

The invention will be explained in more detail below by way of example with reference to the figures, in which:

FIGS. 5, 5a–e show, in cross section, various modular forms of the chamber 2 to 2e of the individual reactor 1.

FIG. 8 shows the cross section through a substance distributor unit corresponding to the line A—A in FIG. 8b.

FIG. 8a shows the longitudinal section corresponding to the line B—B in FIG. 8b.

FIG. 8b shows a plan view of a substance distributor unit.

EXAMPLES

Figure 7:
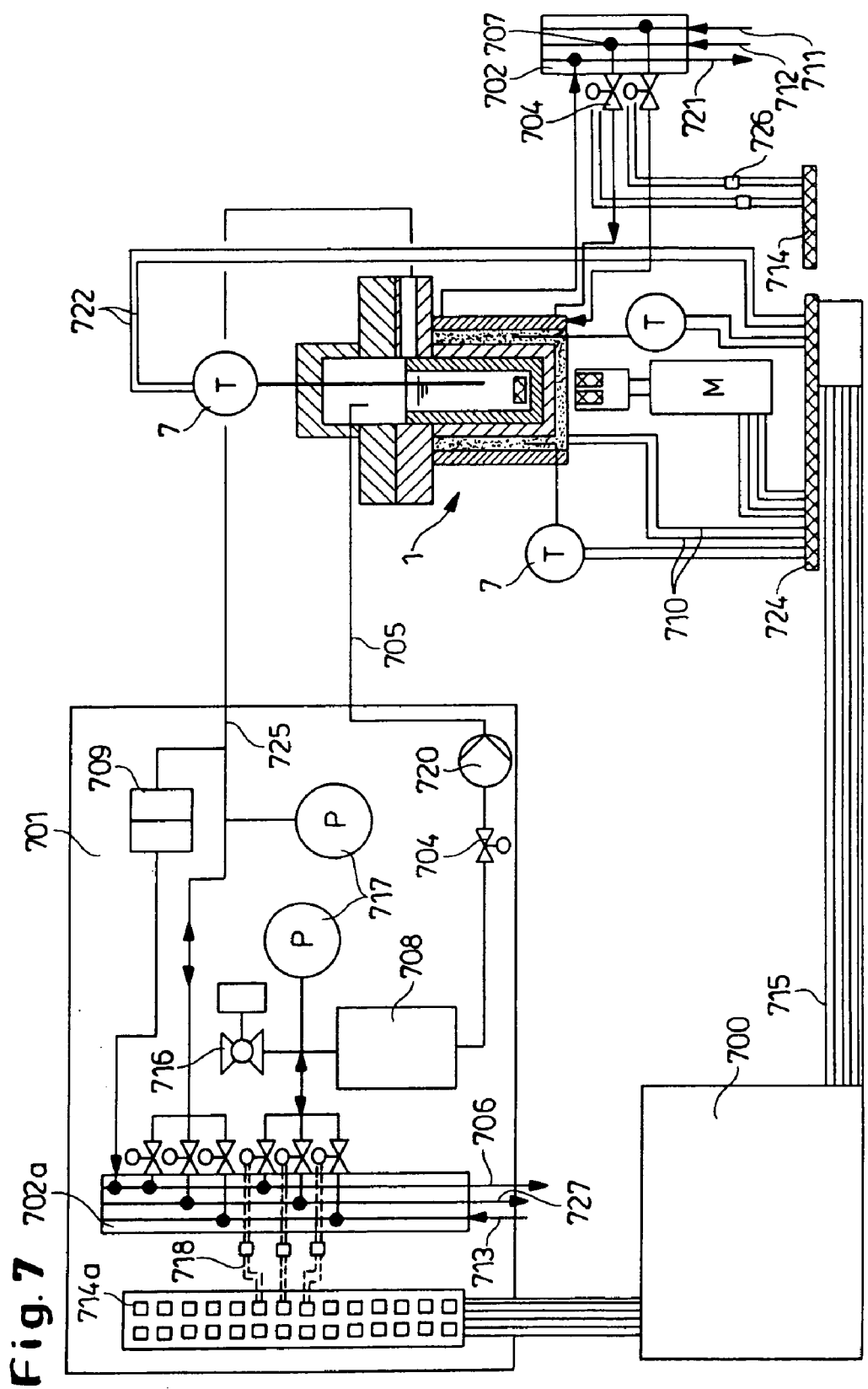
FIG. 7 shows a schematic overview of a test device according to the invention.

FIG. 7 illustrates an overview of the various parts of a test device and their interconnection, e.g. the modularly constructed individual reactor 1 with a lid module 22, the substance distributors 702, 702a with the plate valves 704 and the supply unit 701, which is embodied here as a simple assembly plate. In special applications, the supply unit 701 is designed with integrated main distribution channels as a flat substance distributor 80 (see FIG. 8) and is allocated to at least one individual reactor. Interface modules 714, 724 are furthermore provided in the form of a sensor and actuator circuit board, which is in turn attached to the monitoring unit 700 and a PC (not shown).

It can be seen from FIG. 7 that the individual reactor 1 contains a sample vessel (12 in FIG. 1) and a magnetic stirrer 4 is used, which is driven by a magnetic coupling with a motor (M). The modular structure of the individual reactor 1 is further described below with another stirrer device 4 in the FIG. 1.

A substance distributor unit 702, which has e.g. two feeding substance channels, e.g. for cooling water 711, for cooling air 712, a channel 721 for the common extraction of the cooling air and the cooling water, is attached to the heating/cooling module of the individual reactor 1. Each individual main distribution channel (711, 712, 721) of the substance distributor 702 has, corresponding to the number of individual reactors installed in parallel, feeding or discharging outlets 707 which are equipped with controllable valves 704.

If further processing components (e.g. containers) are needed for supplying the individual reactor 1, owing to the special test requirement, then these can be mounted on the supply unit 701 while being allocated to one or more individual reactors.

Additional processing components are, for example, a container 708 for the provision of a reaction component, which can be dosed into the reaction in the individual reactor 1 at the synthesis start time with an open controllable valve 704 using a pump 720, and a pressure safeguard in the form of a rupture disk 709 which secures the individual reactor against overpressure.

A substance distributor 702a is furthermore included, in order to provide each individual reactor 1 with a feeding and discharging capillary 725 with e.g. nitrogen 713, vacuum 706 and a vent facility 727. The same substance distributor 702a as represented in FIG. 7 can likewise undertake the task of evacuating, inerting or venting the container 708 with the filling valve 716, and additionally connecting the discharging line of the rupture disk 709.

To monitor the pressure in the individual reactor 1 and in the container 708, for example, a pressure sensor 717 is in each case attached to the vent line on the supply unit.

Carrying out syntheses automatically, rationally and reproducibly on the small scale for chemical and processing tasks requires the greatest possible amount of information from the test, which results in the installation of many sensors. For this reason, the interface module 714, 724 in the form of a sensor and actuator circuit board is positioned near to the respective individual reactors and necessary processing components.

This strategy simplifies the layout of the many electrical cables of, for example, pressure and/or temperature sensors of the electro-pneumatic valves 726 for driving the valves, of connections for the electrical heater 710, the electrical supply of the stirring unit 4 and, if required and necessary owing to the processing task, of further electrical sensors. The interface modules are connected by a multi-stranded cable 715 to the monitoring unit 700, to which the personal computer (PC), which is not represented here, is also attached. Because of the sometimes very complex tasks, the number of measurement and regulating points of the overall device can readily rise to more than 200.

The communication with the technical chemical process is carried out with the monitoring unit 700, the described software units and the PC, so that the measured signals can be mathematically converted and recalculated, in order to generate new control signals and therefore monitor the process.

Figure 1:
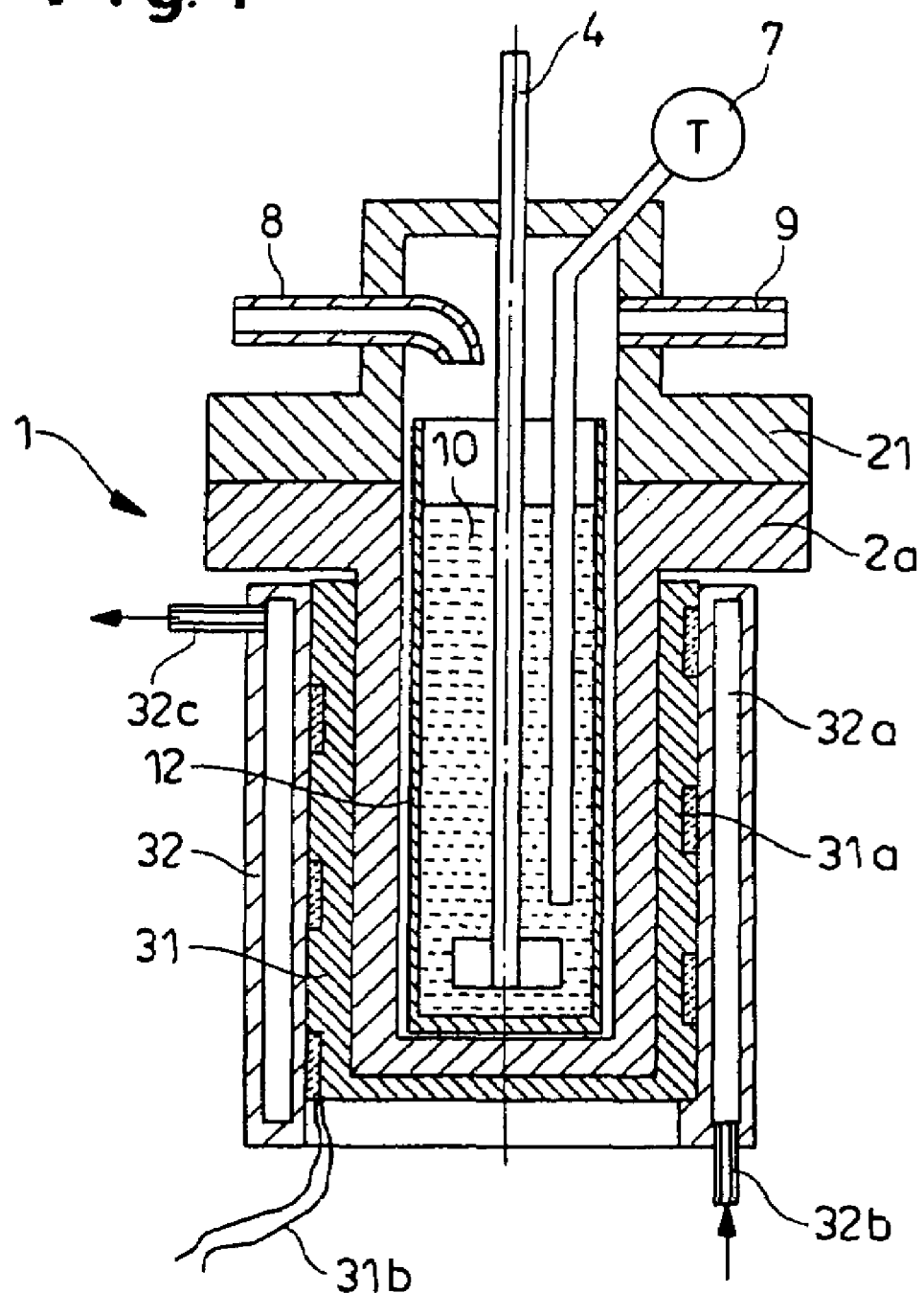
FIG. 1 shows the structure of an individual reactor 1.

The modular individual components of the test device will be described in more detail below:

FIG. 1 illustrates the structure of the individual reactor 1. The individual reactor 1 is itself modularly constructed, and is formed by the pressure-tight chamber 2a, in which a sample vessel 12 for holding the process substance 10 is fitted. According to the processing task, a specially designed pressure-tight lid 21 is positioned on the pressure-tight chamber 2a. Through the lid, a stirring device 4 and a temperature sensor 7 are immersed in the sample vessel 12 with the process substance 10. Not shown in the drawing is a seal which is fitted between the chamber 2a and the lid 21. The pressure-tight lid has at least one feed line 8 and one discharge line 9, via which the substances can be introduced or discharged against pressure. There is an electrical heating instrument 31 in the lower part of the individual reactor 1. On the outer periphery, it has at least one circumferentially spiraling groove 31a, in which the heating wire 31b is laid, so that the desired heat energy can be delivered to the individual reactor 1. The heating instrument 31 fully encloses the bottom of the individual reactor 1, so that the available heat-transferring area is a sufficiently large area even when small working quantities are to be studied. The heating instrument 31 is enclosed by the cooling instrument 32. The cooling instrument 32 has a double wall, which encloses a cavity 32a, into which open a feed line 32b for supplying a heat exchange medium or coolant and a discharge line 32c for discharging the heat exchange medium or coolant.

The outer periphery of the lower part of the individual reactor 1 is in metallic contact with the heating instrument 31, and the heating instrument is in metallic contact with the cooling instrument 32, so as to ensure good heat conduction between the individual metallic components.

The temperature sensor 7 that is represented is connected to the monitoring unit 700 (see FIG. 7).

Figure 2:
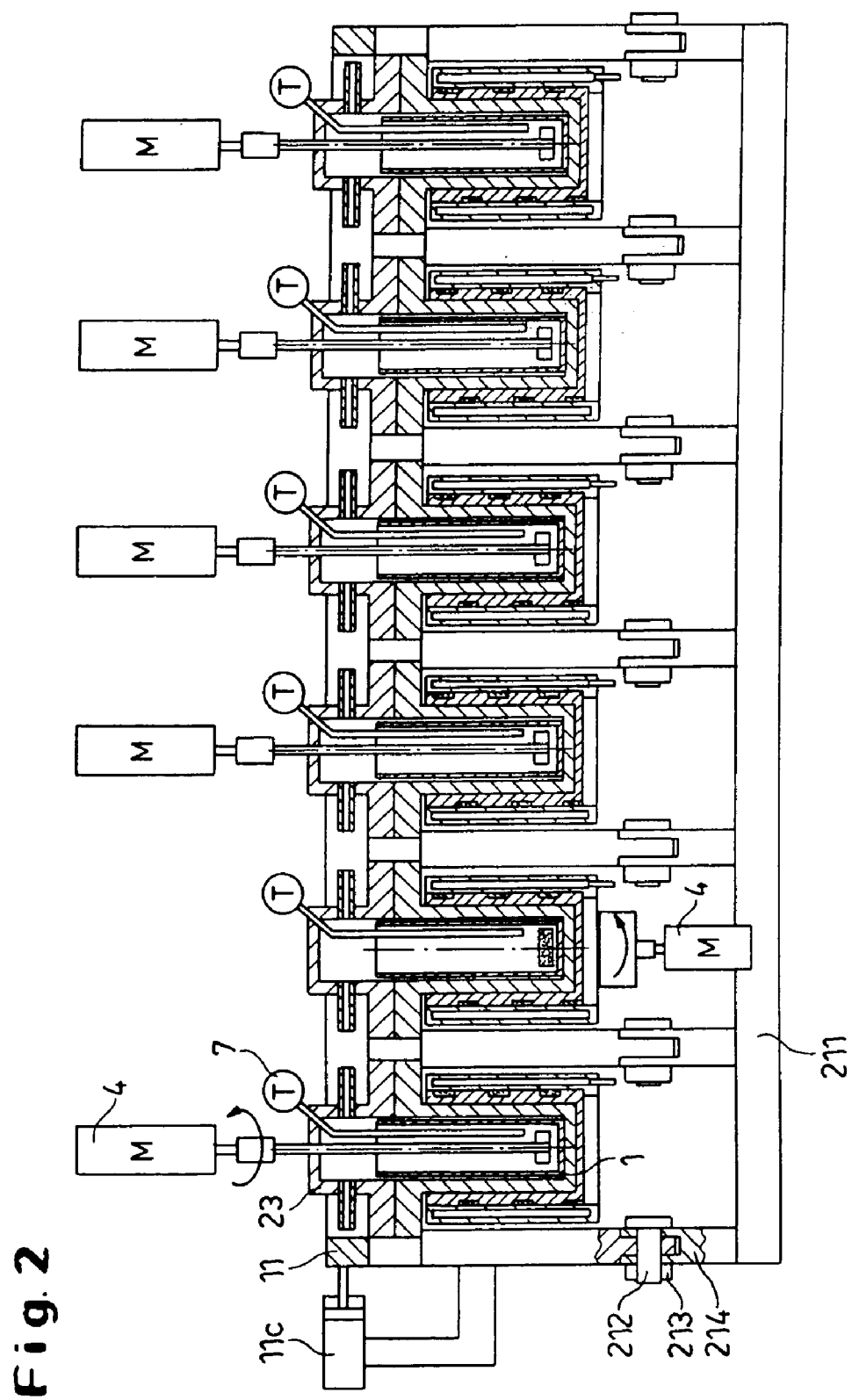
FIG. 2 shows the cross section through a test device with six individual reactors in a holding unit.

FIG. 2 illustrates six individual reactors 1 with lids 23 and temperature sensors 7 next to one another in a holding unit 211. Also to be seen, for example, is the pneumatic drive 11c, with which the sealing latch 11 can be moved, in order to lock the individual reactors simultaneously in a pressure-tight fashion.

FIG. 2 shows five stirring devices 4 fitted to the lid and one fitted to the bottom of the individual reactors 1.

The columns 214 of the holding unit can be designed as hinges, so that the overall reactor system with the sealing unit can be tilted through an angle α of 5 to 60° and fixed using the screws 212 and the nuts 213.

Figure 2A:
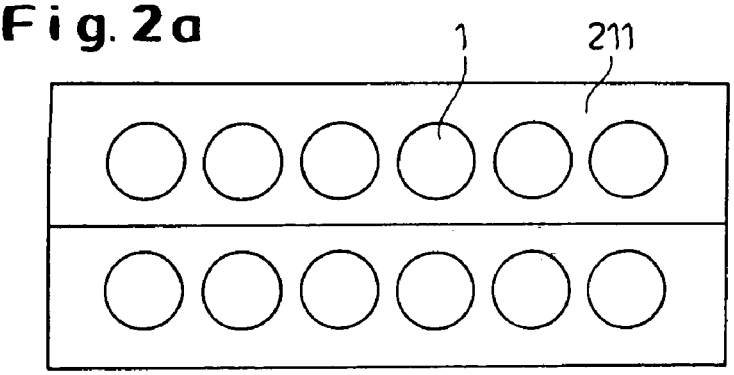
FIGS. 2a, b show two variants of a holding unit.
Figure 2B:
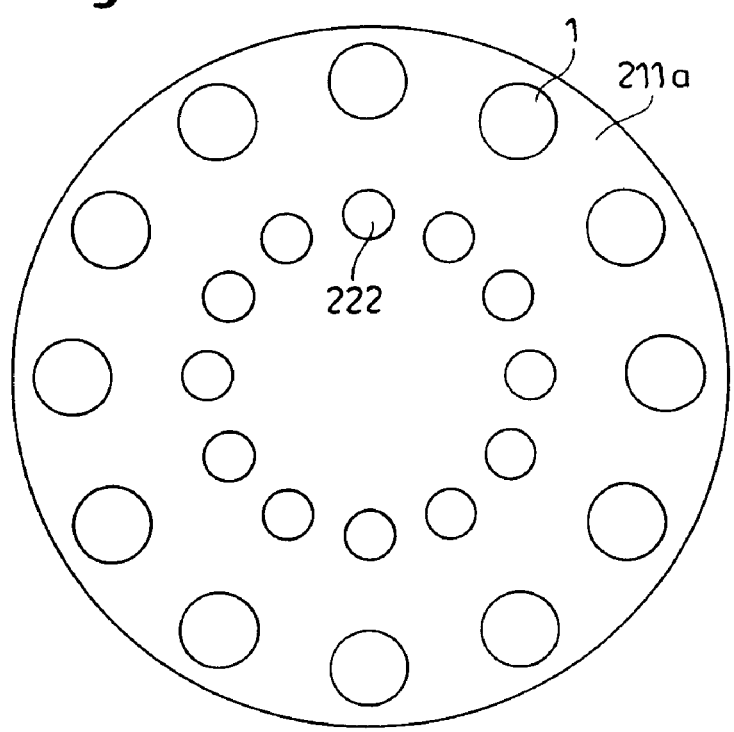
FIGS. 2c, d show a representation of the sealing unit in the closed and open states.

FIG. 2a illustrates that the number of individual reactors 1 can easily be increased to 12 individual reactors, by additionally expanding the holding unit 211 in parallel or by selecting another shape of the holding unit, e.g. a circular arrangement 211a (FIG. 2b) with associated substance stores 222.

Figure 2C:
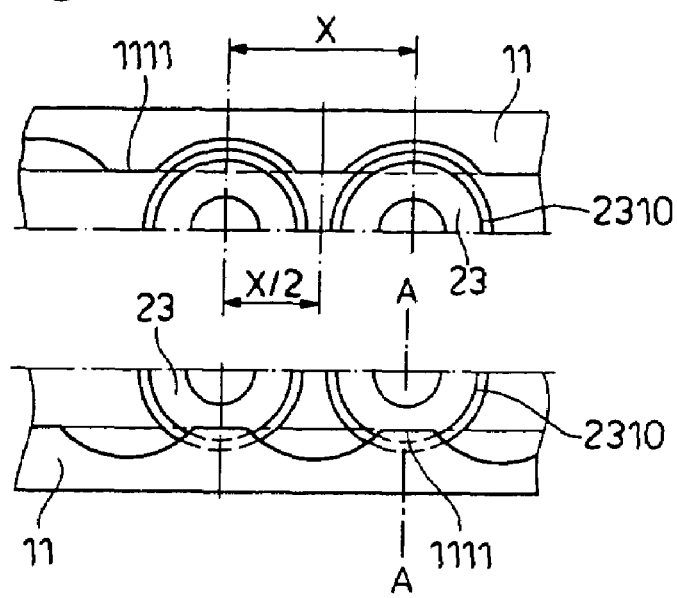

The upper representation in FIG. 2c shows a half of the sealing latch 11 in the open state. It can be seen that the sealing latch is specially shaped, and has a claw 1111 which, in the open state of the sealing latch, stands between two lids (e.g. 23), so that an operator can open each individual reactor 1 by removing the lid (e.g. 23). The lid flange has a phase 2310 which makes it possible, when locking (see FIG. 2c below) by the pneumatic or electrical drive, for the claw 1111 to slide via the phase 2310 onto the surface of the lid flange 23, in order to apply the necessary sealing force onto the inserted seal between the pressure-tight chamber of the individual container 1 and the lid 23. The closing movement of the sealing latch 11 then amounts to half the axial spacing X of the individual reactor.

Figure 2D:
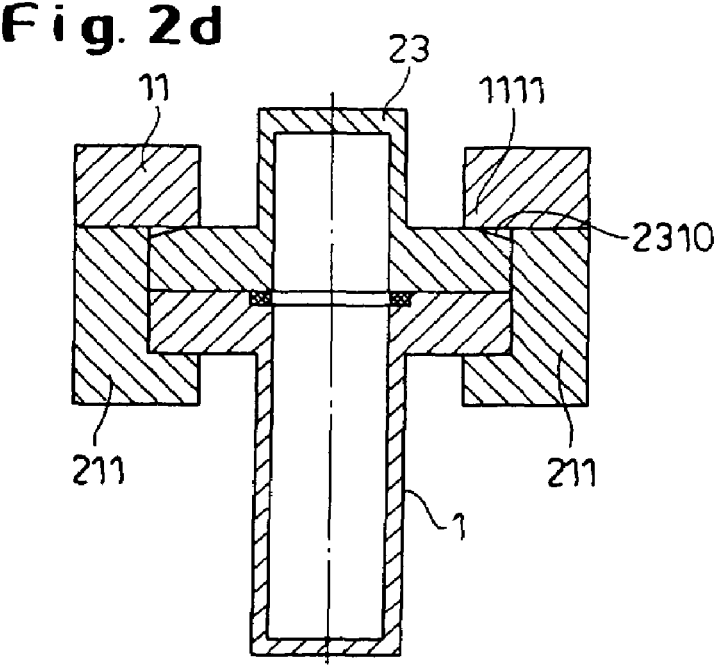

FIG. 2d shows the section 2—2 from FIG. 2c of a locked individual container 1. The phase 2310 on the upper flange of the lid 23 can be seen, and it can also be seen that, in the final state, the latch claw 1111 presses the lid 23 onto the chamber and therefore compresses the inserted seal.

Figure 3A:
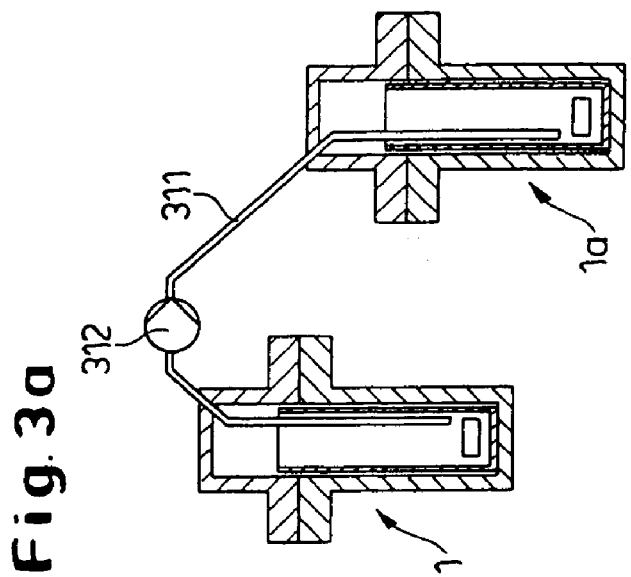
FIGS. 3, 3a show examples of the series coupling of two individual reactors in neighboring holding units.
Figure 3:
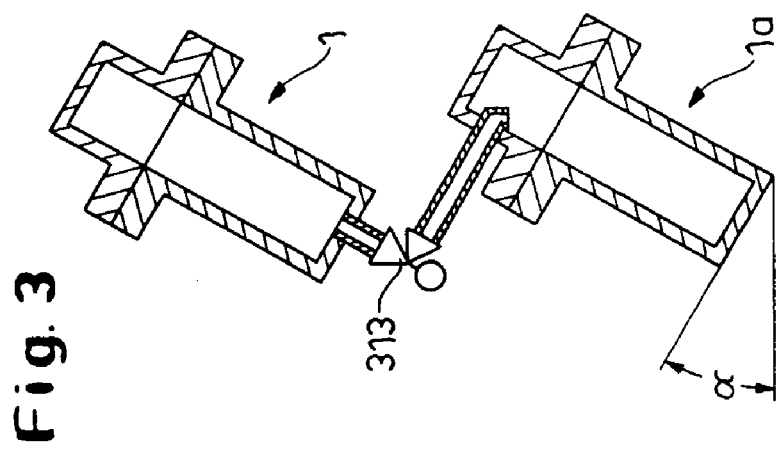

FIGS. 3 and 3a schematically represent a serial connection of two respective individual reactors 1 (in neighboring holding units), specifically with a height-offset arrangement of the individual reactors 1 and 1a through a connecting capillary 311 and an interposed delivery pump 312 (FIG. 3a) and an interposed controllable valve 313 (FIG. 3).

Monitored substance transfer can hence take place from the individual reactor 1 to the individual reactor 1a. The chamber of the reactor 1a is designed integrally with the sample vessel. The planar bottom has an angle α of 30° with respect to the horizontal (FIG. 3).

Figure 4:
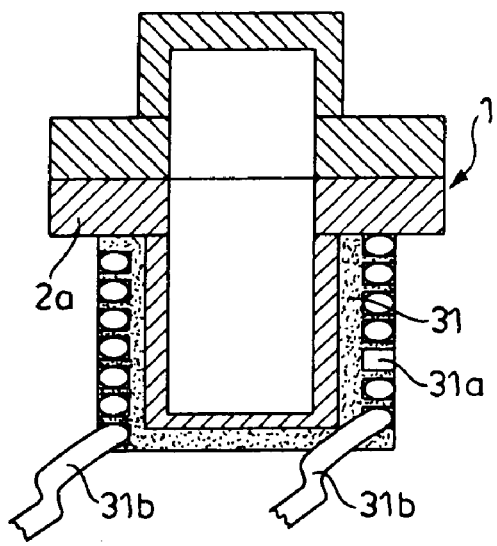
FIG. 4 shows a cross section through a reactor with an electrical heater.

FIG. 4 shows the individual reactor 1 with the pressure-tight chamber 2a and the heating instrument 31 fitted over it. The heating instrument 31 can have a spiraling groove 31a on the outer periphery, the groove base being matched to the shape of the electrical heating wire 31b in order to achieve a good contact area and good heat transfer.

Figure 4A:
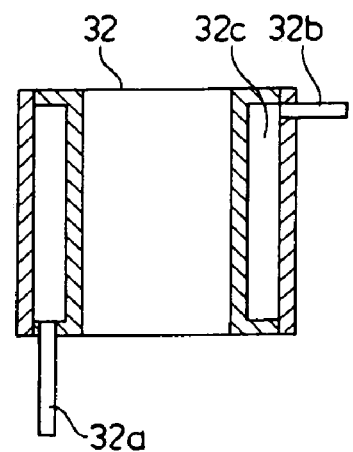
FIGS. 4a, b, c show examples of modular heating/cooling instruments.
Figure 4B:
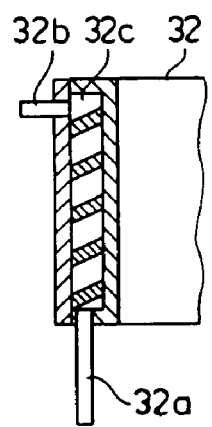
Figure 4C:
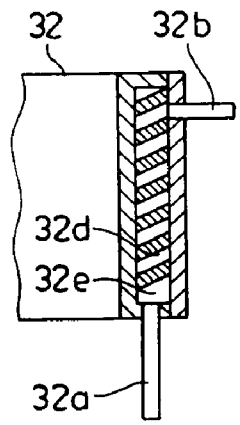

FIGS. 4a, 4b and 4c illustrate further alternative designs of the heating/cooling instrument 32. The cooling instrument 32 in FIG. 4a has a double wall, which encloses a concentric cavity 32c with a feed line 32a and a discharge line 32b for transmitting a coolant or heat exchange medium.

To increase the temperature adjustment area, the concentric cavity is designed specially in FIG. 4b. The temperature adjustment cavity 32c has been formed by a spiraling channel. FIG. 4c represents an embodiment with two spiraling temperature adjustment channels 32e, 32d. Each temperature adjustment channel has a feed line 32d and a discharge line 32b.

The variants of the chamber 2 described below are particularly suitable for the temperature adjustment of the reactors 1.

FIG. 5 to FIG. 5e depict various embodiments of the pressure-tight chamber. The pressure-tight chambers are combined selectively with the lids 21–29 (shown in FIGS. 6–6i) to form a pressure-tight reactor unit 1.

In the form according to FIG. 5, the lid 21 can be seen in a special form without an inner cavity, with the pressure-tight chamber 2 and with a sample vessel 12 fitted.

In the embodiment according to FIG. 5a, the insertable sample vessel 12 is sealed on its outer periphery with an elastic O-ring. Below the inlet and outlet opening of the feed line 131 and discharge line 132, the chamber 2a has a groove 134 made in it to hold the elastic seal 51.

In the variant according to FIG. 5b, the chamber 2b is provided with a rotationally symmetric indentation 133 on the contact plane with the lid 21, to hold an elastic seal or a metallic seal.

In the embodiment according to FIG. 5c, the pressure-tight chamber 2c is represented with at least one feed line 131 and/or at least one discharge line 132. The inserted sample vessel 12 is closed by a septum 136, and is also provided with a capillary 137 for possible pressure balancing between the pressure-tight chamber 2c and the interior of the sample vessel.

In the variant according to FIG. 5d, the chamber 2d does not have product connections, and the sample vessel bears tightly on the inner wall of the chamber 2d. A seal may be laid in the concentric groove 135, so that the applied lid 22 seals the interior of the individual reactor against overpressure.

In FIG. 5e, the chamber 2e is coated with an inert corrosion-proof material (enamel), so that no sample vessel 12 is needed for the tests to be carried out.

FIG. 6 and FIG. 6a–i represent various designs and combinations of the replaceable lids 21, . . . 29. The many alternative lid modules provide considerable flexibility in terms of the differing chemical and processing task and conduct of the experiment.

Figure 6A:
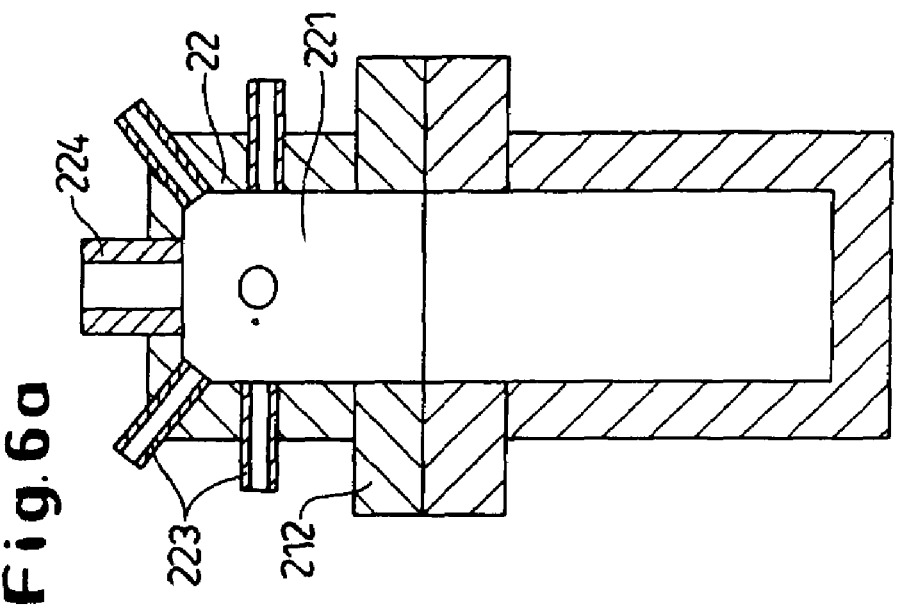
FIGS. 6, 6a–i show, in cross section, various modular designs of the lid 21 to 29 of the individual reactor 1.
Figure 6:
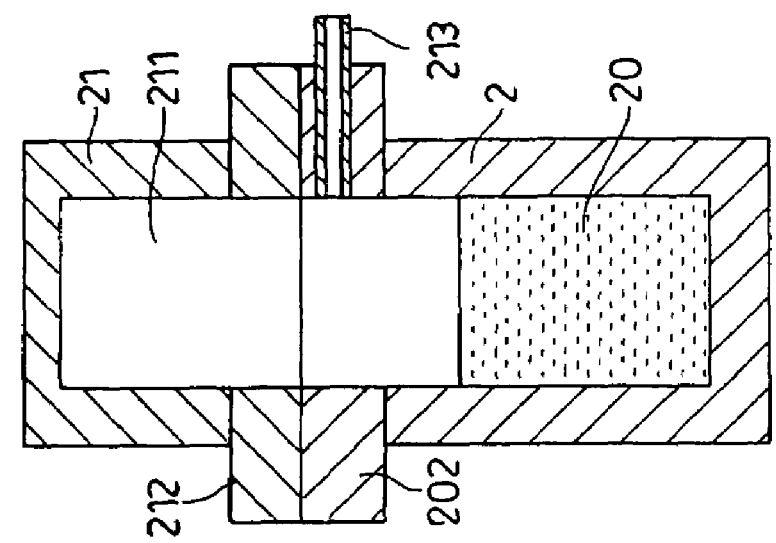

FIG. 6 represents the simplest embodiment in the form of the lid 21 in conjunction with the chamber 2 and the associated test space 20. The chamber 2 does not contain a separable sample vessel 12. The interior of the lid 21 is hollowed so as to form the cavity 211. The volume of the total test space is formed by the cavity 211 and the test space 20. Substance feeding or discharging connection lines 213 are provided in the chamber 2. Not represented in FIG. 6 are the required seals in the horizontal flange region of the lid and the chamber. Also formed on the lid is an offset concentric flange 212 which, with the offset outer ring 202 of the chamber 2, receives the sealing forces for pressure-tight closure of the test space.

FIG. 6a represents a variant of an individual reactor 1 with a modified lid 22. The representation of the lid 22 shows the test space 221 with the offset flange 212 and further separate feeding or discharging capillaries 223, or openings, for the connection of small pipes which are welded directly in the lid 22. One of the openings 223 can be used to directly insert a thermocouple for the internal temperature measurement. An opening 224, which also makes it possible to fit other larger components, is generally provided in the upper lid region.

Figure 6D:
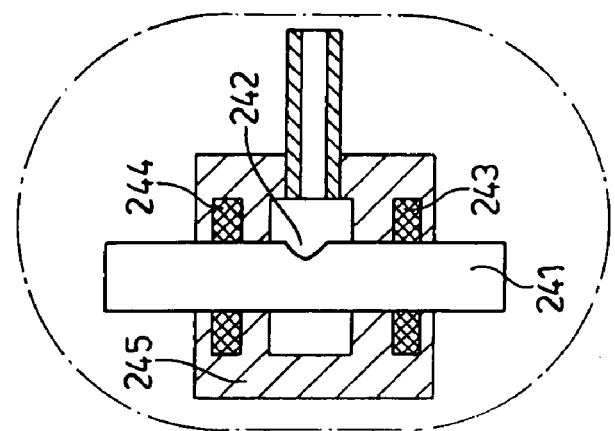
Figure 6C:
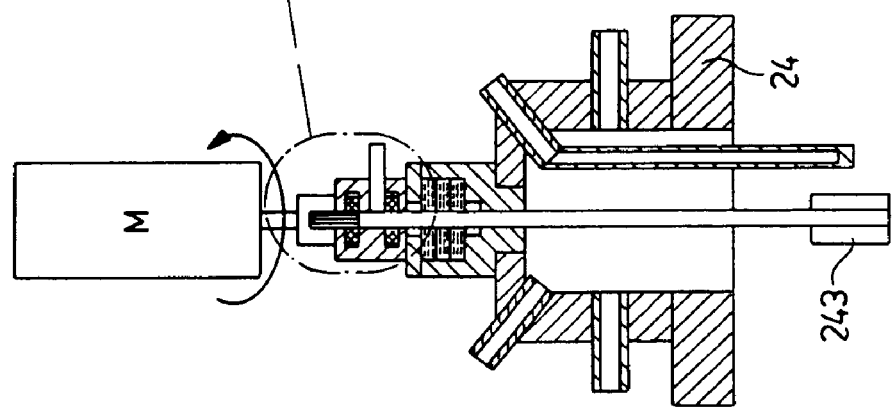
Figure 6B:
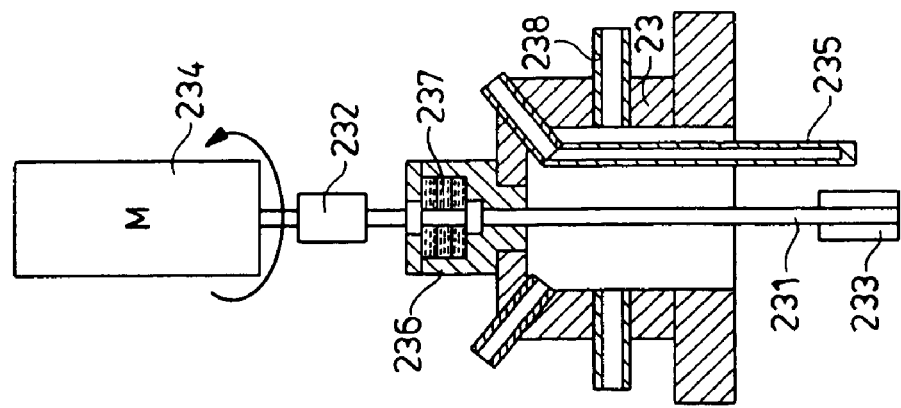

FIG. 6b shows the lid variant 23 with a thermometer protection tube 235, for holding a temperature sensor for the internal temperature control, and a stirrer projecting into the test space, as well as further feed lines and discharge lines 238. The stirring mechanism consists of the stirring shafts 231 with a stirring blade 233, the stirring shaft being guided through a sealing region 237 in the upper region and outside the lid, and the seal being seated in a pressure-tight casing 236. Both elastic O-rings and thermally stable packing glands or shaft sealing rings may be used as the sealing materials and types. The stirring-shaft stub, which protrudes from the casing 236, holds e.g. a force-fit coupling 232 and thereby makes the connection to the stirrer drive 234 comprising a motor M. With this lid variant, in particular, high stirring powers can be transmitted into the reaction mixture to be mixed.

The embodiment according to FIG. 6c shows the structure of the lid 24 with an enhancement compared with the lid 23 in FIG. 6b for the processing application of direct gas introduction through a hollow stirrer shaft 241 (detail FIG. 6d). The hollow stirring shaft 241 has an opening 242 at the shaft head for introducing a substance into the interior of the stirrer shaft and, at the same time, the stirring shaft is opened at the base so that the introduced substance can be fed directly to a synthesis. Around this opening region of the stirring-shaft head, an additional casing 245 with seals 244 (see FIG. 6d for an enlarged detail) is necessary so that the feeding substance, which may be liquid or gaseous, does not reach the surroundings. Alternatively, the additional casing 245 with the seals 244 may also be mounted directly on the lid (not shown), in which case the casing 236 with the seals 237 is unnecessary.

Figure 6E:
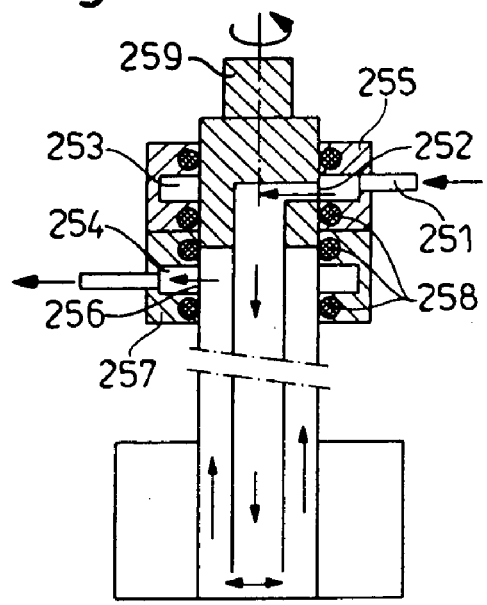

FIG. 6e shows a design of a suitable stirrer-shaft feed-through for a reactor lid as in FIG. 6c. The lid contour of the lid 25 is not represented herein, but instead only the double-walled hollow stirring shaft 259 to be fitted for direct additional temperature adjustment of the substances that are used. The double-walled hollow stirring shaft is closed at the base in the embodiment; the hollow shaft has an influx opening 252 at the head, which is supplied with the heat exchange medium by a concentric supply region 253 in the casing 255 via the inlet 251. The outer wall of the double-walled hollow-shaft stirrer has an outlet opening 256, from which the heat exchange medium leaves the casing 257 via the concentric groove 254. The casing and the double-walled hollow stirring shaft are sealed from the atmosphere and from the test space by elastic seals 258. A shaft stub 259, which is intended to hold the coupling for a drive assembly, is seated on the double-walled hollow-shaft stirrer head.

Figure 6F:
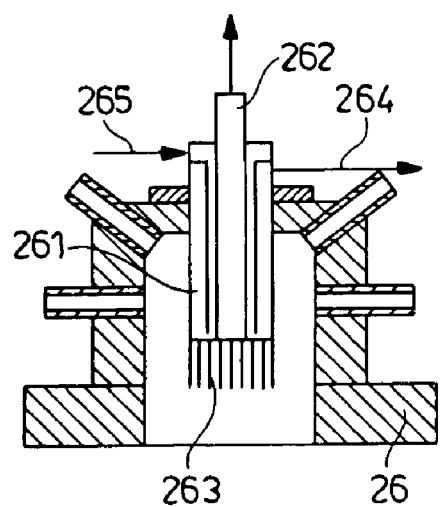

FIG. 6f shows a further variant of a reactor lid 26 with a cooler 261, which protrudes into the interior of the lid 26. The cooler 261 has an access channel 262 at the center for extracting or introducing a reaction component whose temperature, for example, is adjusted as it passes through the cooled access channel. The task of the internal cooler 261 is to condense volatile reaction components in the gas space or test space of the lid 26. Additional cooling fins 263 are therefore fitted at the base of the cooler, which substantially increases the cooling area. The supply connections 264, 265 for feeding and discharging the heat exchange medium of the internal cooler 261 are located outside the lid. The cooling fins 263 may also, in a representation that is not shown, be fitted on the cylindrical periphery of the cooler in the lid cavity, to further increase the cooling area. The internal cooler 261 may be flanged to the lid as a separate component. In order to save on additional seals, however, the cooler is firmly connected to the lid 26 by welding in the embodiment that is shown.

Figure 6G:
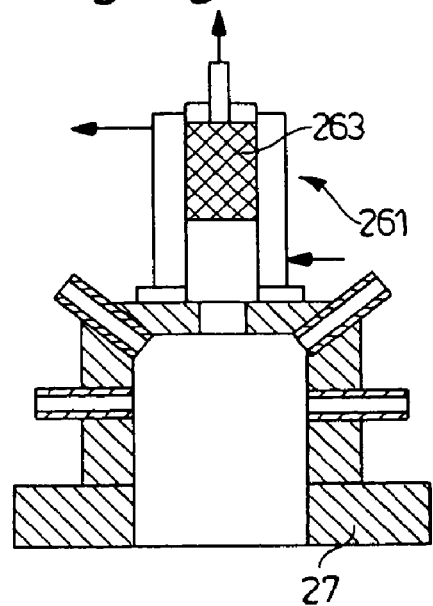

Another comparable design of a lid with a cooler 261 is shown by FIG. 6g. The cooler is arranged outside the lid 27 in this case, the cooling fins 263 being positioned inside the cooler. The external cooler position has the advantage that, owing to the spatial freedom, the cooling assembly can be dimensioned very large. It is furthermore possible, instead of the cooler, to position a temperature-adjustable thermal separation unit on the lid 27.

Figure 6I:
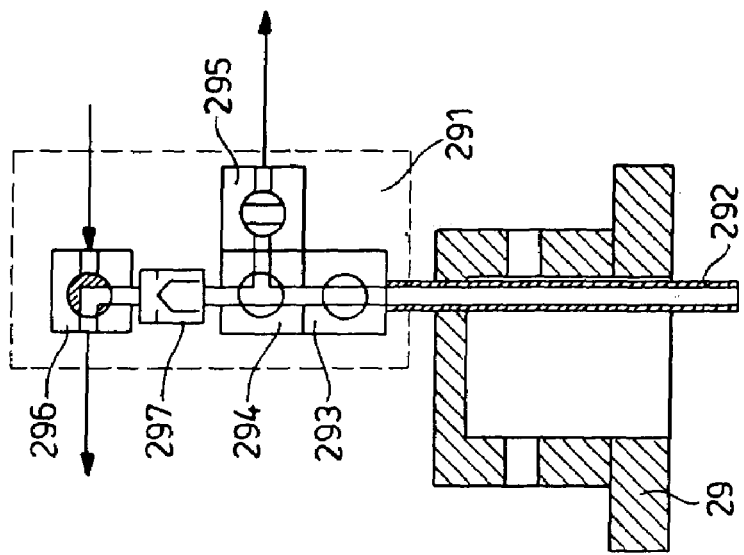
Figure 6H:
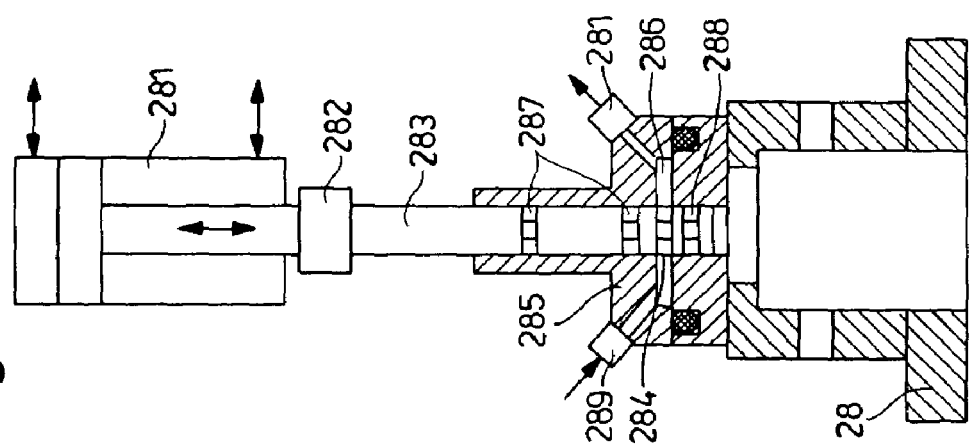

In the further embodiment of the reactor lid according to FIG. 6h, the lid 28 is provided with a dosing device 285 in the form of an annular-gap dispenser. At its head, the annular-gap dispenser has an adjustment unit 281 in the form of a pneumatic cylinder. The dosing piston 283 with the dynamic annular gap 284 is fastened to the piston of the cylinder via a coupling piece 282. Once the adjustment unit 281 has been inserted, a concentric static annular gap 286 is located around the dynamic annular gap 284 of the piston 283 in the casing 285 of the annular-gap dispenser. The two annular gaps 284 and 286 form a common large concentric flow region in the inserted state of the piston. The dosing piston 283 has at least two elastic seals 287 above the dynamic annular gap 284 of the dispenser, and at least one elastic seal 288 below the annular gap 284. The seal 287 does not leave the casing 285 of the dosing device during a dosing stroke of the adjustment unit 281. The seal 288 does leave the casing of the dosing device 285 during a dosing stroke, and is located in the lid cavity in the retracted state of the adjustment unit. The concentric static annular gap has a feeding opening 289 and discharging opening 281. Since the concentric static annular gap 286 is larger than the dynamic annular gap 284, it forms a bypass channel, so that it is possible to produce a continuous flow e.g. of reactant through the dosing device, independently of the piston position.

The variant of the reactor lid according to FIG. 6i is a lid 29 with a sampling device 291. The sampler 291 is attached to an internal riser tube 292 and additionally has a combination of controllable valves. The valve 293 sits directly on the riser tube 292, with a three-way ball cock 294, which is horizontally connected to the ball cock 295, being arranged above. Vertically above the three-way ball cock 294, there is a check valve 297 with a closing body which is designed as a float and, above this, a further three-way cock 296. When liquid rises from the reaction space, the closing body floats up and is pressed into the sealing seat of the check valve 297. The valve 296 connected to the check valve 297 is then connected to a reduced-pressure generator (vacuum side) and to an inert-gas supply (pressure side), the pressure of the inert-gas supply needing to be respectively greater than the prevailing reactor internal pressure at the time of the sampling. At the outlet opening, the valve 295 is connected to an appropriate analyzer (e.g. HPLC).

The sampling through the lid 29 takes place in a plurality of automated control steps, and the valve positions specific thereto:

a) The valve 293 is opened; valve 294 is set to vertical transmission; valve 295 is closed. The valve 296 is opened to the reduced-pressure side. These valve positions permit intake of the reaction mixture in a non-pressurized procedure via the riser tube 292, until the rising liquid presses the closing body of the check valve 297 into the sealing seat.

b) The valve 293 is closed; the connection to the process space of the individual reactor is therefore closed.

c) The valve 296 is opened to the inert-gas supply. Valve 295 is likewise opened and valve 294 ensures connection to the valve 295. The path to the analyzer is opened and the liquid taken in between valve 293 and valve 297 is displaced to the analyzer through the open position of the valve 296 by the pressure of the inert-gas store.

d) The valve 295 is subsequently closed; the path to the analyzer is therefore interrupted, and the free internal valve volume of the valves takes up the pressure of the inert gas.

After the sample volume has been pushed to the analyzer by means of the inert-gas supply, the remaining reaction mixture in the riser tube 291 can be returned to the process mixture.

e) The valve 294 is reset for connection of the valves 293 and 297. The remaining liquid quantity inside the riser tube 291 is delivered to the synthesis mixture by the inert-gas pressure of the valve cavity as soon as valve 293 is reopened.

FIG. 8*b* shows a special embodiment of the supply unit 701 described in FIG. 7, as a flat substance distributor 80 which is simultaneously used as a supply unit, with integrated main distribution channels 84 for supplying the individual reactors 1 e.g. with particularly toxic substances.

FIG. 8*b* schematically represents the substance distributor 80 with integrated distribution channels 84 in a plan view. This simple exemplary embodiment shows a flat substance distributor with a substantially reduced number of possible leakage points, which is used to supply the necessary processing components for the individual reactors 1 that are operated in parallel. Three distributor channels 84 and one vacuum channel 87 can be seen, a controllable valve 704, via which the substance container 708 located in the immediate vicinity can be supplied with product, being for example attached to a feeding channel 84.

FIG. 8 represents a partial section, corresponding to the line 8—8 in FIG. 8*b*, of the specially designed substance distributor 80. Three metal sheets 81, 82, 83 can be seen, which are soldered to one another surface-wide. The distributor channels 84 in the sheet 82 are therefore closed, so that the sheet assembly forms a monolithic channel system having a plurality of pressure-tight main distribution channels.

FIG. 8*a* shows the longitudinal section 9—9 through the substance distributor 80 of the main distribution channel 84, with a feeding opening 85 and a plurality of discharging openings 86, to which controllable valves 704 are attached. The controllable valves 704 may be welded on one side into the upper sheet 81, or firmly connected by screws to the substance distributor unit 80 designed as an assembly unit, these screwed valves 704 being sealed from the supply unit by an elastic seal (not represented here).

Figure 9:
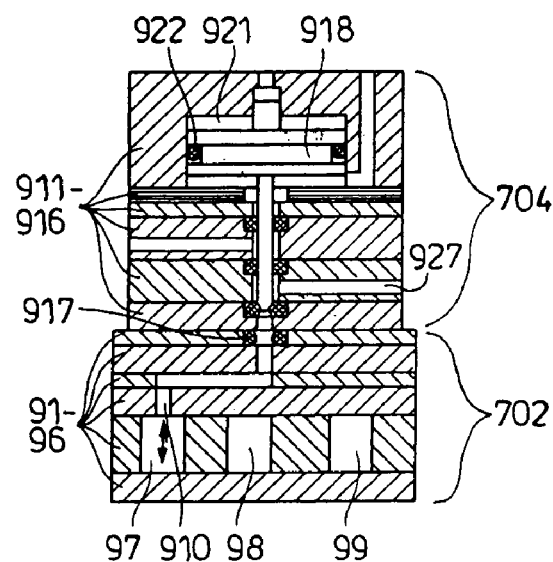
FIGS. 9, 9a, b show the cross section through the substance distributor unit 702 with a plate valve 704 mounted on it.

FIG. 9 represents the particular embodiment of a specially developed plate valve. The valve is connected to a compact substance distributor unit 702 with separate main distribution channels, the branchings of the channels 97 and 98 crossing in separate planes lying above one another. The plate valve 704 is screwed directly onto the outlet opening of a branching channel 910. The substance distributor unit 702 consists here of six metal sheets (91–96), five of the sheets being structured by recesses. The sheets are matched to the valve width, so that three branching channels 910 can be equipped with a controllable valve in a narrow region of the feeding substance main distribution channels 97–99. The connecting point of the substance distributor unit 702 and the plate valve 704 is sealed from the surroundings by an elastic seal 917. Of the plates 911–916, the plate 915 (as shown in FIG. 9*a*) represents an elastic flat seal which seals the pneumatic space.

In this embodiment, the plate valve 704 has six plates and an internal offset cylinder with a spindle 918. The internal cylinder with a spindle 918 sits in a plurality of elastic seals 919, 920, 925 (as shown in FIG. 9*b*), the seal 925 in the part 911 simultaneously forming the sealing seat of the valve and, in the closed state, hindering the substance passage from the main distribution channel 97–99 to the outlet channel 927 of the plate valve 704. The seal 919 seals the valve space, which is in contact with the product, from the control head, the pneumatic pressurized-air space or from the surroundings. The seal 920 seals the controlling pressurized-air space 921 of the cylinder 918. The head plate 916, which simultaneously holds the cylinder 918 with an elastic seal 922, has two connection openings 923, 924 for supplying the cylinder with control air.

The effect of the connection opening 923 is that, when pressurized air is supplied, the cylinder with the spindle is raised, the shaped cylinder tip being lifted off the elastic sealing seat 925 (FIG. 9*b*) and the substance flow being released. If pressurized air is supplied via the connection opening 924, while simultaneously relieving the pressurized-air connection at the opening 923, then the cylinder with the spindle is pressed down into the elastic sealing seat 925 and the substance flow is interrupted. The quantity of substance flowing through depending on the cylinder position leaves the plate valve via the channel 927. Components that continue further, such as capillaries, containers, temperature adjustment elements or the individual reactor are directly connected to the outlet point of the channel 927. The cylinder 918 represents a pressure converter owing to the presence of different sizes of pressure-action surfaces. The maximum occurring pressure, generally a process pressure, in this case acts on the smallest area on the cylinder tip, and the controlling pressure, generally the pressurized air, acts on the largest area on the cylinder head. In exceptional cases, the plate valve may be attached to hydraulic supply systems for control, which can generate substantially higher pressures. In these cases, the upper action surface area of the cylinder may be substantially smaller.

Figure 9A:
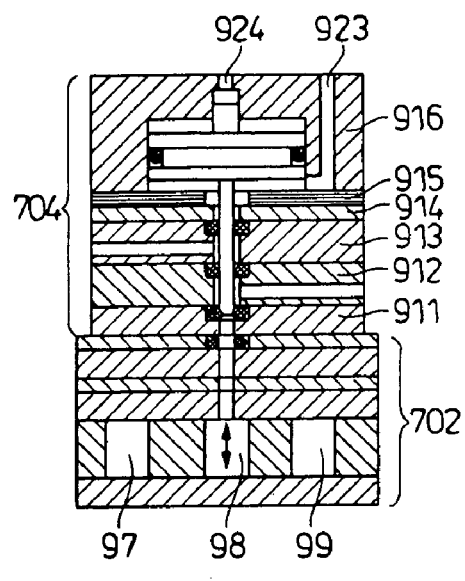
Figure 9B:
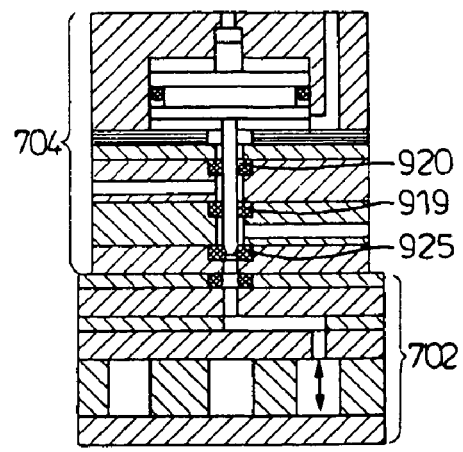

FIGS. 9*a* and 9*b* show similarly designed plate valves 704 on the common compact substance distributor unit 702, a plurality of plate valves 704 being fitted one behind the other on the distributor unit 702, and being connected to the same main distribution channel.

Figure 10:
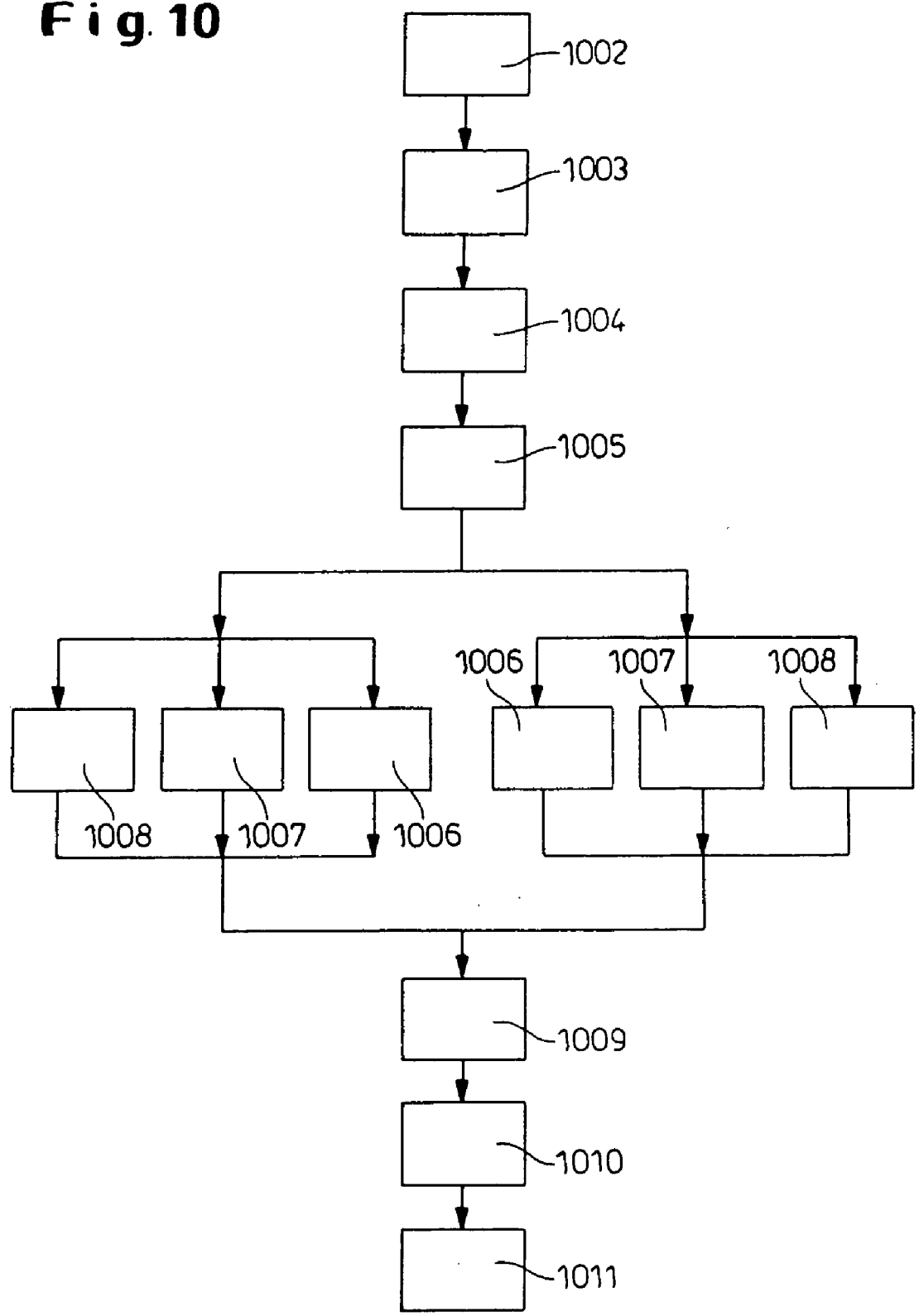
FIG. 10 shows a block diagram to explain the software modules for carrying out a test.

FIG. 10 schematically depicts the interconnection of the various software units used to carry out a test.

From the library, in which all the software units are stored, the operator can compile his or her specific test procedure according to the software units, by copying the required software units from the library and saving them on a worksheet and connecting them to one another. A typical test run is made up in the following way. The software unit 1002 "system check" is followed by the software unit 1003 "seal testing" for all the reactor units. All the reactor units are inerted, in the case of a sensitive process, by using the software unit 1004. The inerting is carried out by displacement or dilution of the chamber contents. The operator furthermore wishes that e.g. three unit reactor units are to be operated with a temperature of 100° C., by using the software unit "temperature adjustment" 1006, and three reactor units with a temperature of 130° C. The synthesis in the individual containers is furthermore to take place under constant stirring, with the software unit 1007 "stirring".

In addition, pressure-controlled substance dosing is carried out using the software unit 1008 "dosing" with a selectable number of dosing strokes per test.

Once the test in the individual reactors has been completed, all the individual reactors are put into a defined final state by the software unit 1009 "test termination". Once all the tests have been completed, the test data is transferred by the software unit 1010, and the operator finally receives the completion-report information from the software unit 1011.

TEST EXAMPLE

A description will be given below of the structure and operation of a parallel test system, constructed in a modular and miniaturized way, in which a catalyst for a polymerization is to be tested with respect to chemical and processing aspects and the mode of action is to be studied. This test was carried out at a temperature of up to 200° C. and a pressure up to 16 bar, although the technical test system was configured and constructed for substantially higher pressure and temperature requirements. The maximum operating temperature of the test was limited by substance-specific safety limit values. A substance volume per individual reactor 1 of about 8 ml was selected for the parallel test. The maximum liquefied monomer quantity to be dosed and the quantity of base polymer and reaction accelerator provided resulted from this. The liquid base polymer provided and the reaction accelerator were introduced into roll-necked test tubes by using a balance, then the roll-necked test tubes were put into the respective individual reactors 1 and the closure lid was put on, so as to permit automated closure of the closed individual containers operated under pressure.

The modularly constructed test system consisted of six individual reactors 1 arranged in parallel (FIG. 2) with a test-space volume of about 25 ml, the individual reactors 1 having been equipped with a lid variant 28 according to the invention that was required for the processing test requirement (FIG. 6*h*) and a temperature sensor 7. Six individual reactors are inserted into a common holding unit 211 (FIG. 2) with a simultaneously operating closure latch 11, which is provided with a pneumatic drive 11*c*. A roll-necked test tube, in which a magnetic stirrer is placed, was used as the sample vessel 12. The magnetic stirrer was driven by an electric motor 4 and a magnetic coupling (FIG. 2), the drive having been positioned below the individual reactor. The individual reactors had the electrical heating instrument 31 according to FIG. 4 and a cooling instrument 32 according to FIG. 4*c*. Owing to the exothermic polymerization, it was necessary to use a two-channel cooling instrument, which permits simultaneous cooling with air and water. The heating instrument 31 was equipped with two further temperature sensors 7, in order to provide the possibility of carrying out cascade regulation according to the internal temperature of the individual container, and the second temperature sensor was used for the so-called over-temperature safeguard (integrated safety), which was meant to obviate the need for human monitoring during an automated procedure.

The pressure-tight chamber 2*a* (FIG. 5*a*) was provided with feed lines 131 and discharge lines 132 in the flange region for this application.

Below the individual reactors 1, two compact substance distributors 702 (similar to FIG. 9), with directly fitted plate valves 704 for supplying the six individual reactors, were mounted directly on the holding unit. One substance distributor with three main distribution channels supplied the cooling instrument, for example with distribution channel 97 being used for the cooling-air supply, channel 98 for the cooling-water supply and channel 99 for discharging both coolants. The discharging lines 32*b* (FIG. 4*b*) of the cooling module were combined and connected directly to the substance distributor, so that a controllable plate valve was not needed for the discharge channel 99.

The second compact substance distributor is used to supply the individual containers. In this case, the main distribution channels 97, 98, 99 are used for the following task: channel 99 for connection to a vacuum pump, channel 98 for the nitrogen supply and channel 97 for deliberate venting of the individual reactors. The feed and discharge of media for the individual reactors 1 took place at different times in this test procedure. All the outlet openings of the substance distributor were therefore equipped with controllable plate valves, and the substance outlet openings 927 (FIG. 9) of the plate valves were connected together to a connection opening of the pressure-tight chamber. A further connection opening in the flange region of the pressure-tight chamber was used to provide the possibility of connecting a pressure sensor 717 and an automatic safety instrument, such as a rupture disc 709 (FIG. 7). Required electropneumatic valves (converters) and interface modules 714, 724, in the form of sensor and actuator circuit boards, were positioned below the holding unit of the individual reactors. There, with extremely short electrical lines from the individual sensors and actuators, the connection from the interface module to the monitoring unit 700 was made by using multi-stranded ribbon cables 715, so that communication between the monitoring unit and the PC by means of appropriate software blocks with the technical process could be ensured. The lid (28) which was provided with an annular-gap dispenser and was used for dosing very small quantities of liquefied monomer into a pressure space, was attached to a supply plate which, in this special case, was not designed as a substance distributor. This supply unit, or plate, contained the following components: The multi-position valve, which supplies the annular-gap dispenser sequentially with liquefied monomer as required, the holder of the electro-pneumatic valves for controlling the pistons in the annular-gap dispensers, the discharging main channels of the individual reactor vents and the outlet openings of the automatic safety instruments (rupture disks) to the central disposal units of the laboratory.

For automated operation, the following software units from the software library were combined in a particular sequence (FIG. 10):

system check 1002
seal testing 1003
inerting 1 with vacuum procedure 1004
preliminary nitrogen pressure 1005
temperature adjustment 1006
stirring 1007
dosing 1008
test termination 1009
data transfer 1010
completion report 1011

The software units 1002, 1003, 1004, 1005 were organized in series and needed to be completed in order to be able to start the parallel-connected software modules of temperature adjustment 1006, stirring 1007, and dosing 1008—the actual experiment, namely the polymerization. The synthesis was started after switching off the individual-reactor heaters, by starting the dosing software module 1008, here specially with sub and total stroke numbers preset individually for each individual reactor, when the set reactor internal temperature was reached. When the total dispenser stroke number set for each individual reactor was reached, the test in the respective reactor was terminated by software module 1009. Finally, the data transfer 1010 and the completion report 1011 took place, so that the operator could open the parallel reactor system without risk in order to remove the sample vessels and carry out the analysis.

The automated chemical processing test, with all preparatory work, took about two hours, so that a plurality of test runs could be performed per working day. In this case, inter alia, the simultaneous closure of the reactors turned out to be particularly time-saving.

The expected high reproducibility of carrying out the reaction with the same chemical batches and the same procedures could be confirmed by analyzing the product solution. Further tests with the same procedure confirmed different activities when varying the reaction accelerators. This exothermic polymerization test confirmed, in particular, that a mass-optimized and fast-reacting heating/cooling instrument is necessary for miniaturized parallel tests, so that chemical and physical tests can be carried out reproducibly under processing conditions, and heating and cooling times of the entire reactor system need to be kept small in order to permit meaningful evaluation from the analysis of the test results. It could furthermore be established that the individual temperature control of the reactors did not entail any mutual temperature influence of the individual reactors, despite a narrow and compact design. The individual reactor control in terms of pressure, temperature and, for example, stirring power is an essential basis of economical test operation for effective work with parallel reactor systems.

The heating times of about 10 minutes were small compared with the actual synthesis time. Minor structural differences between the individual reactors, e.g. due to manufacturing tolerances, have a super-proportionate effect in the case of miniaturized chemical processing experiments.

Separate control of the individual reactors is therefore indispensable, since otherwise the accuracy required for the application (comparability) would not be obtained.

Furthermore, simultaneously connecting up various heat exchange media with different heat capacities by using software, as a function of the reactor internal temperature, is a significant factor for carrying out technical processes reproducibly. For example, if cooling is only carried out with water, the technical process and therefore the product temperature inside the reactor cannot be kept constant, since the heat efflux predominates. In the worst case, the synthesis is interrupted and, in the case of pressurized reactions, the internal pressure drops.

The tests carried out took place under pressure. At the same time, the reaction could be tracked with the aid of the pressure drop, which resulted from the consumption of the dosed monomer, at constant temperature. Furthermore, it was found particularly advantageous to use the compact substance distributor 702 in immediate proximity to the individual reactors 1. It increased the actual reaction space of the individual container insubstantially, so that the vapor pressure formed by the dosed component inside the reactor was immediately identifiable at the process control system (monitoring unit 700) with the PC. For operation and automation, it was found to be positive that, when using the substance distributors with controllable plate vales, there were only a few possibilities of leakage and an automated pressurized procedure with reproducible pressure samples could be carried out without problems.

The automated procedure was selected in such a way that the tests could be applied directly to an industrial scale. The safety instruments and controls selected and used allowed the tests to be carried out very substantially without human involvement, so that only a few manual interventions to prepare the parallel tests were necessary, and the error rate due to individual influences by the experimenter could be reduced correspondingly.

We claim:

1. A device for carrying out chemical or physical experiments in parallel on process substances to develop technical methods, comprising a plurality of individual reactors for holding the process substances, temperature and pressure control systems for controlling the temperature and pressure of the individual reactors independently of one another, wherein the individual reactors each have:
   a pressure-tight chamber with a separable sample vessel, and optionally a stirring device,
   a heating instrument, cooling instrument, or both, for individual temperature adjustment of each sample vessel,
   a monitoring unit for monitoring and, in cooperation with said temperature and pressure control systems, controlling, at least the pressure and the temperature in the individual reactors,
   a pressure-tight lid,
   the individual pressure-tight lids, the chambers or both having, independently of one another, feed lines and optionally discharge lines for individual process substances, and the lids of a plurality of the chambers being simultaneously closable by a common lid closer, and wherein said pressure control systems optionally include pressure reducing lines, and wherein the substance feed lines and discharge lines, and the optional pressure reducing lines, are connected to a substance distributor unit, a supply unit, or both, which optionally connect the feed lines and discharge lines, and optionally the pressure reducing lines, selectively to one another or to a main substance feed line, a main substance discharge line, a main pressure reducing line or which connect a combination of said lines.

2. The device as claimed in claim 1, wherein the sealing lid closer is a sealing latch, which is closed and locked pneumatically, hydraulically or by an electric drive.

3. The device as claimed in claim 1, wherein a plurality of individual reactors are combined as blocks in a single holding unit.

4. The device as claimed in claim 1, wherein the lids have pressure reducing lines.

5. The device as claimed in claim 1, wherein the heating instruments, the cooling instruments, or both are removable from the chambers.

6. The device as claimed in claim 1, wherein the cooling instrument is adapted to operate with alternating heat exchange media, to operate simultaneously with different heat exchange media, or both, the intake of which is controlled or regulated by the monitoring unit.

7. The device as claimed in claim 1, wherein each of said reactors has a stirring device and said stirring device is a stirrer; the temperature and pressure, and optionally, the stirrer speed of individual reactors are controlled independently of one another throughout the pressure range from 1 bar to 400 bar, the temperature range of and from −80° C. to +400° C. and optionally stirrer speeds of up to 2000 rpm.

8. The device as claimed in claim 1, wherein the sample vessels are integral with the chambers.

9. The device as claimed in claim 1, wherein the bottoms of the sample vessels are planar and oriented by an angle α of 5 to 60° C. with respect to the horizontal.

10. The device as claimed in claim 1, wherein two or more individual reactors are connected in series with one another by their substance feed lines and discharge lines.

11. The device as claimed in claim 10, wherein two neighboring individual reactors connected in series with one another are e arranged at different heights than each other.

12. The device as claimed in claim 10, wherein two neighboring individual reactors connected in series with one another are operable at different pressures, and a delivery assembly is connected into at least one of the connecting lines between the individual reactors.

13. The device as claimed in claim 1, wherein the substance distributor unit is comprised of at least three metal sheets which are connected to one another and which lie above one another in layers, and in which substance channels and, optionally, vacuum channels as well as inlets end outlets are provided.

14. The device as claimed in claim 13, wherein the uppermost sheet in has inlets to external supply lines, the lowermost sheet has outlets to the reactor lines, and the middle sheet or sheets have or has connecting channels.

15. The device as claimed in claim 13, wherein the outlets of the substance distributor unit are connected to the feed lines or the discharge lines of the individual reactors by switchable or regulatable valves.

16. The device as claimed in claim 15, wherein said switchable or regulatable valves are connected directly to the substance distributor unit.

17. The device as claimed in claim 15, wherein said switchable or regulatable valves pneumatically controlled.

18. The device as claimed in claim 17, wherein said switchable or regulatable valves are adapted to close automatically if the pneumatic control fails.

19. The device as claimed in claim 1, wherein each of said reactors has a stirring device and the monitoring unit also controls the speed of the stirring devices.

20. The device as claimed in claim 15, wherein the monitoring unit also controls the valves.

21. The device as claimed in claim 1, wherein the sample vessels are removable from the chambers, and an additional seal is provided either between the upper rim of the sample vessels and the chamber wall or between the lid wall and the top edge of the sample vessels.

22. The device as claimed in claim 21, further comprising pressure compensation channels between the sample vessels within the chambers and the space between the sample vessels and the walls of the chambers.

23. The device as claimed in claim 1, wherein each of said individual reactors has a stirring device, the device is a modular device; the individual reactors, the heating instrument, the cooling instrument, the monitoring unit, the stirring device, optionally the substance distributor unit and optionally the supply unit, being modular units are removable independently of one another.

24. A method for conducting experiments on process substances in parallel wherein said experiments are conducted in a device as claimed in claim 1, and wherein at least the following method steps are carried out:
   a) checking the supply lines to the individual reactors
   b) introducing samples of the process substances into the sample vessels of the individual reactors,
   c) closing and seal-testing the individual reactors,
   d) optionally inerting the reaction spaces of the individual reactors by evacuating the reaction spaces and then admission of inert gas thereto,
   e) optionally establishing a predetermined inert gas pressure,
   f) setting limit values and optionally time gradients for pressure, the temperature and, optionally, the stirring speed of test substances within the sample vessels,
   g) controlling the process temperature, and
   h) carrying out the test, optionally while adding further amounts of the same or different substances to the sample vessels.

25. The method as claimed in claim 24, wherein the experiments are tests of physical reactions involving the process substances, chemical reactions involving the process substances or both.

26. The method as claimed in claim 25, wherein the tests are of exothermic chemical reactions, and are carried out at constant pressure and constant temperature.

27. The method as claimed in claim 26, the introduction of the test samples according to step b) is carried out after step g), the test substances being preheated to a predetermined temperature.

28. The method as claimed in claim 26, wherein at least one liquid process substance is added to the sample vessel while monitoring the pressure within the sample vessel.

* * * * *